US010180840B2

(12) United States Patent
Burger et al.

(10) Patent No.: US 10,180,840 B2
(45) Date of Patent: Jan. 15, 2019

(54) DYNAMIC GENERATION OF NULL INSTRUCTIONS

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 14/998,147

(22) Filed: Dec. 23, 2015

(65) Prior Publication Data
US 2017/0083325 A1 Mar. 23, 2017

Related U.S. Application Data

(60) Provisional application No. 62/221,003, filed on Sep. 19, 2015.

(51) Int. Cl.
*G06F 9/30* (2018.01)
*G06F 9/32* (2018.01)
(Continued)

(52) U.S. Cl.
CPC .......... *G06F 9/3016* (2013.01); *G06F 9/268* (2013.01); *G06F 9/3004* (2013.01);
(Continued)

(58) Field of Classification Search
None
See application file for complete search history.

(56) References Cited

U.S. PATENT DOCUMENTS 5,317,734 A    5/1994  Gupta
5,615,350 A    3/1997  Hesson
(Continued)

FOREIGN PATENT DOCUMENTS

JP    2001175473 A    6/2001
JP    2002149401 A    5/2002
(Continued)

OTHER PUBLICATIONS

International Search Report and Written Opinion for PCT/US2016/051413, dated Jan. 2, 2017, 16 pages.
(Continued)

*Primary Examiner* — Eric Coleman
(74) *Attorney, Agent, or Firm* — Klarquist Sparkman, LLP

(57) ABSTRACT

Apparatus and methods are disclosed for dynamic nullification of memory access instructions, such as memory store instructions. In some examples of the disclosed technology, an apparatus can include memory and one or more block-based processor cores. One of the cores can include an execution unit configured to execute memory access instructions comprising a plurality of memory load and/or memory store instructions contained in an instruction block. The core can also include a hardware structure storing data for at least one predicate instruction in the instruction block, the data identifying whether one or more of the memory store instructions will issue if a condition of the predicate instruction is satisfied. The core may further include a control unit configured to control issuing of the memory access instructions to the execution unit based at least in a part on the hardware structure data.

18 Claims, 16 Drawing Sheets

(51) Int. Cl.

| | | |
|---|---|---|
| *G06F 9/38* | (2018.01) | |
| *G06F 15/80* | (2006.01) | |
| *G06F 9/26* | (2006.01) | |
| *G06F 11/36* | (2006.01) | |
| *G06F 12/0862* | (2016.01) | |
| *G06F 9/35* | (2018.01) | |
| *G06F 12/1009* | (2016.01) | |
| *G06F 13/42* | (2006.01) | |
| *G06F 12/0806* | (2016.01) | |
| *G06F 15/78* | (2006.01) | |
| *G06F 9/46* | (2006.01) | |
| *G06F 9/52* | (2006.01) | |
| *G06F 9/345* | (2018.01) | |
| *G06F 9/355* | (2018.01) | |
| *G06F 12/0875* | (2016.01) | |
| *G06F 12/0811* | (2016.01) | |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30047* (2013.01); *G06F 9/30058* (2013.01); *G06F 9/30072* (2013.01); *G06F 9/30076* (2013.01); *G06F 9/30087* (2013.01); *G06F 9/30098* (2013.01); *G06F 9/30101* (2013.01); *G06F 9/30105* (2013.01); *G06F 9/30145* (2013.01); *G06F 9/30167* (2013.01); *G06F 9/30189* (2013.01); *G06F 9/32* (2013.01); *G06F 9/345* (2013.01); *G06F 9/35* (2013.01); *G06F 9/3802* (2013.01); *G06F 9/383* (2013.01); *G06F 9/3804* (2013.01); *G06F 9/3822* (2013.01); *G06F 9/3824* (2013.01); *G06F 9/3836* (2013.01); *G06F 9/3838* (2013.01); *G06F 9/3842* (2013.01); *G06F 9/3848* (2013.01); *G06F 9/3851* (2013.01); *G06F 9/3853* (2013.01); *G06F 9/3855* (2013.01); *G06F 9/3859* (2013.01); *G06F 9/3867* (2013.01); *G06F 9/3891* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0806* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/13* (2018.01); *Y02D 10/14* (2018.01); *Y02D 10/151* (2018.01)

(56) References Cited

U.S. PATENT DOCUMENTS

| | | |
|---|---|---|
| 5,669,001 A | 9/1997 | Moreno |
| 5,729,228 A | 3/1998 | Franaszek et al. |
| 5,790,822 A | 8/1998 | Sheaffer et al. |
| 5,796,997 A | 8/1998 | Lesartre et al. |
| 5,799,167 A | 8/1998 | Lesartre |
| 5,845,103 A | 12/1998 | Sodani et al. |
| 5,903,750 A | 5/1999 | Yeh et al. |
| 5,905,893 A | 5/1999 | Worrell |
| 5,917,505 A | 6/1999 | Larson |
| 5,943,501 A | 8/1999 | Burger et al. |
| 6,016,399 A | 1/2000 | Chang |
| 6,061,776 A | 5/2000 | Burger et al. |
| 6,115,808 A * | 9/2000 | Arora ............... G06F 9/30094 712/210 |
| 6,161,170 A | 12/2000 | Burger et al. |
| 6,164,841 A | 12/2000 | Mattson et al. |
| 6,178,498 B1 | 1/2001 | Sharangpani et al. |
| 6,240,510 B1 | 5/2001 | Yeh et al. |
| 6,282,708 B1 | 8/2001 | Augusteijn et al. |
| 6,314,493 B1 | 11/2001 | Luick |
| 6,353,883 B1 | 3/2002 | Grochowski et al. |
| 6,493,820 B2 | 12/2002 | Akkary et al. |
| 6,513,109 B1 | 1/2003 | Gschwind et al. |
| 6,529,922 B1 | 3/2003 | Hoge |
| 6,662,294 B1 | 12/2003 | Kahle et al. |
| 6,820,192 B2 | 11/2004 | Cho et al. |
| 6,892,292 B2 | 5/2005 | Henkel et al. |
| 6,918,032 B1 | 7/2005 | Abdallah et al. |
| 6,965,969 B2 | 11/2005 | Burger et al. |
| 6,988,183 B1 | 1/2006 | Wong |
| 7,032,217 B2 | 4/2006 | Wu |
| 7,085,919 B2 | 8/2006 | Grochowski et al. |
| 7,095,343 B2 | 8/2006 | Xie et al. |
| 7,299,458 B2 | 11/2007 | Hammes |
| 7,302,543 B2 | 11/2007 | Lekatsas et al. |
| 7,380,038 B2 | 5/2008 | Gray |
| 7,487,340 B2 | 2/2009 | Luick |
| 7,571,284 B1 | 8/2009 | Olson |
| 7,624,386 B2 | 11/2009 | Robison |
| 7,676,650 B2 | 3/2010 | Ukai |
| 7,676,669 B2 | 3/2010 | Ohwada |
| 7,836,289 B2 | 11/2010 | Tani |
| 7,853,777 B2 | 12/2010 | Jones et al. |
| 7,877,580 B2 | 1/2011 | Eickemeyer et al. |
| 7,917,733 B2 | 3/2011 | Kazuma |
| 7,970,965 B2 | 6/2011 | Kedem et al. |
| 8,055,881 B2 | 11/2011 | Burger et al. |
| 8,055,885 B2 | 11/2011 | Nakashima |
| 8,127,119 B2 | 2/2012 | Burger et al. |
| 8,180,997 B2 | 5/2012 | Burger et al. |
| 8,181,168 B1 | 5/2012 | Lee et al. |
| 8,201,024 B2 | 6/2012 | Burger et al. |
| 8,250,555 B1 | 8/2012 | Lee et al. |
| 8,312,452 B2 | 11/2012 | Neiger et al. |
| 8,321,850 B2 | 11/2012 | Bruening et al. |
| 8,332,452 B2 | 12/2012 | Mejdrich et al. |
| 8,433,885 B2 | 4/2013 | Burger et al. |
| 8,447,911 B2 | 5/2013 | Burger et al. |
| 8,464,002 B2 | 6/2013 | Burger et al. |
| 8,583,895 B2 | 11/2013 | Jacobs et al. |
| 8,817,793 B2 | 8/2014 | Mushano |
| 9,021,241 B2 | 4/2015 | Burger et al. |
| 9,043,769 B2 | 5/2015 | Vorbach |
| 9,053,292 B2 | 6/2015 | Abdallah |
| 2001/0032306 A1 | 10/2001 | Duesterwald et al. |
| 2001/0032308 A1 | 10/2001 | Grochowski et al. |
| 2002/0016907 A1 | 2/2002 | Grochowski et al. |
| 2002/0083313 A1 | 6/2002 | De Oliveira Kastrup Pereira et al. |
| 2002/0095666 A1 | 7/2002 | Tabata et al. |
| 2003/0023959 A1 | 1/2003 | Park |
| 2003/0028755 A1 | 2/2003 | Ohsawa |
| 2003/0070062 A1 | 4/2003 | Krishnan et al. |
| 2003/0088759 A1 | 5/2003 | Wilkerson |
| 2003/0128140 A1 | 7/2003 | Xie et al. |
| 2004/0083468 A1 | 4/2004 | Ogawa et al. |
| 2004/0193849 A1 | 9/2004 | Dundas |
| 2004/0216095 A1 | 10/2004 | Wu |
| 2005/0172277 A1 | 8/2005 | Chheda et al. |
| 2005/0204348 A1 | 9/2005 | Horning et al. |
| 2006/0090063 A1 | 4/2006 | Theis |
| 2007/0223629 A1 * | 9/2007 | Zeng ............... H03M 13/41 375/341 |
| 2007/0226735 A1 | 9/2007 | Nguyen et al. |
| 2007/0239975 A1 | 10/2007 | Wang |
| 2007/0260854 A1 | 11/2007 | Smith et al. |
| 2007/0288733 A1 | 12/2007 | Luick |

(56) References Cited

U.S. PATENT DOCUMENTS

| | | |
|---|---|---|
| 2008/0028183 A1 | 1/2008 | Hwu et al. |
| 2008/0109637 A1 | 5/2008 | Martinez et al. |
| 2008/0168233 A1 | 7/2008 | Luc |
| 2009/0013135 A1 | 1/2009 | Burger et al. |
| 2009/0013160 A1 | 1/2009 | Burger et al. |
| 2009/0019263 A1 | 1/2009 | Shen et al. |
| 2009/0031310 A1 | 1/2009 | Lev et al. |
| 2009/0106541 A1 | 4/2009 | Mizuno et al. |
| 2009/0158017 A1 | 6/2009 | Mutlu et al. |
| 2009/0172371 A1 | 7/2009 | Joao et al. |
| 2010/0146209 A1 | 6/2010 | Burger et al. |
| 2010/0161948 A1 | 6/2010 | Abdallah |
| 2010/0191943 A1 | 7/2010 | Bukris |
| 2010/0325395 A1 | 12/2010 | Burger et al. |
| 2011/0035551 A1 | 2/2011 | Hooker et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0202749 A1 | 8/2011 | Jin et al. |
| 2012/0158647 A1 | 6/2012 | Yadappanavar et al. |
| 2012/0246448 A1 | 9/2012 | Abdallah |
| 2012/0246657 A1 | 9/2012 | Abdallah |
| 2012/0303933 A1 | 11/2012 | Manet et al. |
| 2012/0311306 A1 | 12/2012 | Mushano |
| 2013/0024725 A1 | 1/2013 | Cremer et al. |
| 2013/0086370 A1 | 4/2013 | Burger et al. |
| 2013/0159674 A1* | 6/2013 | Muff ............... G06F 9/30072 712/208 |
| 2013/0198499 A1 | 8/2013 | Dice et al. |
| 2013/0254486 A1 | 9/2013 | McCormick, Jr. |
| 2013/0326200 A1 | 12/2013 | Kleen et al. |
| 2014/0006714 A1 | 1/2014 | Cherukuri et al. |
| 2014/0108862 A1 | 4/2014 | Rafacz et al. |
| 2014/0181475 A1 | 6/2014 | Abdallah |
| 2014/0195787 A1 | 7/2014 | Scalabrino et al. |
| 2014/0281402 A1 | 9/2014 | Comparan et al. |
| 2014/0281404 A1* | 9/2014 | Iyengar ............... G06F 9/30145 712/216 |
| 2014/0331236 A1 | 11/2014 | Mitra et al. |
| 2014/0372736 A1 | 12/2014 | Greenhalgh |
| 2015/0006452 A1 | 1/2015 | Kim et al. |
| 2015/0026444 A1 | 1/2015 | Anderson et al. |
| 2015/0067662 A1 | 3/2015 | Palalau |
| 2015/0089188 A1* | 3/2015 | Gonion ............... G06F 9/30036 712/3 |
| 2015/0089191 A1* | 3/2015 | Gonion ............... G06F 9/30036 712/7 |
| 2015/0100757 A1 | 4/2015 | Burger et al. |
| 2015/0127928 A1 | 5/2015 | Burger et al. |
| 2015/0186293 A1 | 7/2015 | Lin |
| 2015/0199199 A1 | 7/2015 | Burger et al. |
| 2015/0199272 A1 | 7/2015 | Goel et al. |
| 2016/0132331 A1 | 5/2016 | Godard et al. |
| 2016/0203081 A1 | 7/2016 | Kimura |
| 2016/0378661 A1 | 12/2016 | Gray et al. |
| 2017/0083319 A1 | 3/2017 | Burger et al. |
| 2017/0083320 A1 | 3/2017 | Burger et al. |
| 2017/0083324 A1 | 3/2017 | Burger et al. |
| 2017/0083328 A1 | 3/2017 | Burger et al. |
| 2017/0083329 A1 | 3/2017 | Burger et al. |
| 2017/0083330 A1 | 3/2017 | Burger et al. |
| 2017/0083331 A1 | 3/2017 | Burger et al. |
| 2017/0083341 A1 | 3/2017 | Burger et al. |

FOREIGN PATENT DOCUMENTS

| | | |
|---|---|---|
| JP | 2003084973 A | 3/2003 |
| JP | 2013500539 A | 1/2013 |
| WO | WO2014193878 | 12/2014 |

OTHER PUBLICATIONS

PCT Chapter II Demand for International Preliminary Examination and amended claims under Article 34 submitted to the European Patent Office dated Jun. 19, 2017, for PCT/US2016/051413, 7 pages.

Burger et al., "Design and Implementation of the TRIPS EDGE Architecture", In Proceedings of the 32nd Annual International Symposium on Computer Architecture, Jun. 4, 2005, pp. 1-41.

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Ipek et al., "Core Fusion: Accommodating Software Diversity in Chip Multiprocessors", In Proceedings of the 34th annual international symposium on Computer architecture, Jun. 9, 2007, 12 pages.

Kane, "PA-RISC 2.0 Architecture", In Publication of Prentice Hall PTR, Retrieved on: Sep. 17, 2015, 28 pages.

Kavi, et al., "Concurrency, Synchronization, Speculation—the Dataflow Way", In Journal of Advances in Computers, vol. 96, Nov. 23, 2013, pp. 1-41.

Liu, "Hardware Techniques to Improve Cache Efficiency", In Dissertation of the University of Texas at Austin, May 2009, 189 pages.

McDonald et al., "Characterization of TCC on Chip-Multiprocessors," Parallel Architectures and Compilation Techniques, 2005. PACT 2005. 14th International Conference on. IEEE, 2005, 12 pages.

Munshi, et al., "A Parameterizable SIMD Stream Processor", In Proceedings of Canadian Conference on Electrical and Computer Engineering, May 1, 2005, pp. 806-811.

Pengfei et al., "M5 Based EDGE Architecture Modeling", In Proceedings of IEEE International Conference on Computer Design, Oct. 3, 2010, pp. 289-296.

Pierce et al., "Wrong-Path Instruction Prefetching", In Proceedings of the 29th Annual IEEE/ACM International Symposium on Microarchitecture, Dec. 2, 1996, pp. 1-17.

Souza et al., "Dynamically Scheduling VLIW Instructions", In Journal of Parallel and Distributed Computing, vol. 60, Jul. 2000, pp. 1480-1511.

Wu et al., "Block Based Fetch Engine for Superscalar Processors", In Proceedings of the 15th International Conference on Computer Applications in Industry and Engineering, Nov. 7, 2002, 4 pages.

Zmily et al., "Block-Aware Instruction Set Architecture", In Proceedings of ACM Transactions on Architecture and Code Optimization, vol. 3, Issue 3, Sep. 2006, pp. 327-357.

Zmily, et al., "Improving Instruction Delivery with a Block-Aware ISA", In Proceedings of 11th International Euro-Par Conference on Parallel Processing, Aug. 30, 2005, pp. 530-539.

Abraham, et al., " Predictability of Load/Store Instruction Latencies", In Proceedings of the 26th annual international symposium on Microarchitecture, Dec. 1, 1993, pp. 139-152.

Bouwens et al., "Architecture Enhancements for the ADRES Coarse-Grained Reconfigurable Array," High Performance Embedded Architectures and Compilers, Springer Berlin Heidelberg pp. 66-81 (2008).

Burger et al., "Scaling to the End of Silicon with EDGE Architectures," In Proceedings of Computer, vol. 37, Issue 7, Jul. 1, 2004, pp. 44-55.

Chrysos et al., "Memory Dependence Prediction using Store Sets", In Proceedings of the 25th Annual International Symposium on Computer Architecture, Jun. 1998, pp. 142-153.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

(56) References Cited

OTHER PUBLICATIONS

Duric et al., "EVX: Vector Execution on Low Power EDGE Cores," Design, Automation and Test in European Conference and Exhibition, Mar. 24-28, 2014, 4 pages.
Duric et al., "ReCompAc: Reconfigurable compute accelerator," IEEE 2013 International Conference on Reconfigurable Computing and FPGAS (Reconfig), Dec. 9, 2013, 4 pages.
"Explicit Data Graph Execution", Retrieved on: Aug. 6, 2015, Available at: https://en.wikipedia.org/wiki/Explicit_Data_Graph_Execution.
Fallin, et al., "The Heterogeneous Block Architecture", In Proceedings of 32nd IEEE International Conference on Computer Design, Oct. 19, 2014, pp. 1-8.
Gebhart et al., "An Evaluation of the TRIPS Computer System," In Proceedings of the 14th international conference on Architectural support for programming languages and operating systems, Mar. 7, 2009, 12 pages.
Govindan, "E3:Energy-Efficient EDGE Architectures", In Dissertation, Aug. 2010, 244 pages.
Govindan et al., "Scaling Power and Performance via Processor Composability," IEEE Transaction on Computers, No. 1, Aug. 2014, 14 pages.
Govindaraju et al., "DySER: Unifying Functionality and Parallelism Specialization for Energy-Efficient Computing," IEEE Micro, IEEE Service Center, Sep. 1, 2012, 14 pages.
Gray and Smith, "Towards an Area-Efficient Implementation of a High ILP EDGE Soft Processor: Comparing Out-of-Order Dataflow Instruction Scheduler Designs," poster temporarily on display during The 22nd IEEE International Symposium on Field-Programmable Custom Computing Machines, May 11-13, 2014, Boston, Massachusetts (poster on display for approximately 1-2 hours, and less than one day, May 2014).
Gulati et al., "Multitasking Workload Scheduling on Flexible Core Chip Multiprocessors," In Proceedings of the Computer Architecture News, vol. 36, Issue 2, May 2008, 10 pages.
Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.
"How Many Clock Cycles does a RISC/CISC Instruction Take to Execute?", Retrieved on: Aug. 24, 2015, Available at: http://electronics.stackexchange.com/questions/170551/how-many-clock-cycles-does-a-risc-cisc-instruction-take-to-execute.
Huang et al., "Compiler-Assisted Sub-Block Reuse," Retrieved on: Apr. 9, 2015; available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).
Huang, "Improving Processor Performance Through Compiler-Assisted Block Reuse," In Doctoral Dissertation, May, 2000, 125 pages.
Keckler et al., "Tera-Op Reliable Intelligently Adaptive Processing System (Trips)," In AFRL-IF-WP-TR-2004-1514, document dated Apr. 2004, 29 Pages.
Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).
Kozumplik, et al., "TRIPS to the Semantic EDGE", Retrieved on: Sep. 22, 2015, Available at: http://vbn.aau.dk/ws/files/61072300/1212050422.pdf.
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Li et al., "Hybrid Operand Communication for Dataflow Processors," document not dated, 10 pages (also published as Li et al., "Hybrid operand communication for dataflow processors," In Workshop on Parallel Execution of Sequential Programs on Multi-core Architectures, pp. 61-71 (2009)).
Maher, "Atomic Block Formation for Explicit Data Graph Execution Architectures", In Dissertation of Doctor of Philosophy, Aug. 2010, 185 pages.
Maher et al., "Merging Head and Tail Duplication for Convergent Hyperblock Formation," In Annual IEEE/ACM International Symposium on Microarchitecture, Dec. 2006, 12 pages.
McDonald et al., "TRIPS Processor Reference Manual," In Technical Report TR-05-19, document marked Mar. 10, 2005, 194 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
"Microarchitecture", Retrieved on: Aug. 24, 2015, Available at: haps://github.com/jbush001/NyuziProcessor/wiki/Microarchitecture.
Microsoft Research, "E2," document downloaded on Apr. 10, 2015 from http://research.microsoft.com/en-us/projects/e2/.
Nagarajan et al., "Critical Path Analysis of the TRIPS Architecture," In IEEE International Symposium on Performance Analysis of Systems and Software, Mar. 19, 2006, 11 pages.
Nagarajan et al., "A Design Space Evaluation of Grid Processor Architectures," In Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Park, et al., "Reducing Design Complexity of the Load/Store Queue", In Proceedings of the 36th annual IEEE/ACM International Symposium on Microarchitecture, Dec. 3, 2003, 12 pages.
Pericas et al., "A Two-Level Load/Store Queue Based on Execution Locality" "In Proceedings of 35th International Symposium on Computer Architecture", Jun. 21, 2008, 12 pages.
Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).
Rahman, Reza, "Intel® Xeon Phi™ Core Micro-Architecture", Published on: Aug. 29, 2014, Available at: https://software.intel.com/en-us/articles/intel-xeon-phi-core-micro-architecture.
Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Roesner, "Counting Dependence Predictors," in Undergraduate Honors Thesis, May 2, 2008, 25 pages.
Sankaralingam, et al., "Distributed Microarchitectural Protocols in the TRIPS Prototype Processor", In Proceedings of the 39th Annual International Symposium on Microarchitecture, Dec. 9, 2006, 12 pages.
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages
Sankaralingam, "Polymorphous Architectures: A Unified Approach for Extracting Concurrency of Different Granularities", In Doctoral Dissertation of Philosophy, Aug. 2007, 276 pages.

(56) References Cited

OTHER PUBLICATIONS

Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sethumadhavan et al., "Design and Implementation of the TRIPS Primary Memory System," In Proceedings of International Conference on Computer Design, Oct. 1, 2006, 7 pages.
Sethumadhavan, et al. "Late-Binding: Enabling Unordered Load-Store Queues", In Proceedings of the 34th Annual International Symposium on Computer Architecture, Jun. 9, 2007, pp. 347-357.
Sibi et al., "Scaling Power and Performance via Processor Composability," University of Texas at Austin technical report No. TR-10-14 (2010), 20 pages.
Smith et al., "Compiling for EDGE Architectures", In Proceedings of the International Symposium on Code Generation and Optimization, Mar. 26, 2006, 11 pages.
Smith et al., "Dataflow Predication", In Proceedings of 39th Annual IEEE/ACM International Symposium on Microarchitecture, Dec. 9, 2006, 12 pages.
Smith, "Explicit Data Graph Compilation," In Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Tamches et al., "Dynamic Kernel Code Optimization," In Workshop on Binary Translation, 2001, 10 pages.
Valentine, Bob, "Introducing Sandy Bridge", Retrieved on: Aug. 24, 2015, Available at: https://www.google.co.in/url?sa=t&rct=j&q=&esrc=s&source=web&cd=4&cad=rja&uact=8&ved=0CDEQFjADahUKEwiY6sLBvMPHAhUPkI4KHdMcBbs&url=https%3A%2F%2Fwww.cesga.es%2Fen%2Fpaginas%2FdescargaDocumento%2Fid%2F135&ei=Q_nbVdi8CI-gugTTuZTYCw&usg=AFQjCNGtHzO-y4sOzichYNEgFwQ5KpS9QA&sig2=6L_um4ib2v45Sb2b2Wv_kw.
Zmily, Ahmad Darweesh, "Block-Aware Instruction Set Architecture", In Doctoral Dissertation, Jun. 2007, 176 pages.
International Preliminary Report on Patentability for PCT/US2016/051413, dated Dec. 18, 2017, 13 pages.
Written Opinion of the International Preliminary Examining Authority for PCT/US2016/051413, dated Aug. 29, 2017, 12 pages.
"Very Long Instruction Word", Retrieved From: http://en.wikipedia.org/wiki/Verylong_instruction_word:, Feb. 13, 2013, 7 Pages.
"Final Office Action Issued in U.S. Appl. No. 14/757,944", dated Jul. 9, 2018, 18 Pages.
"Non Final Office Action Issued in U.S. Appl. No. 14/757,944", dated Sep. 21, 2017, 21 Pages.
"Non Final Office Action Issued in U.S. Appl. No. 15/060,404", dated Jul. 24, 2017, 41 Pages.
"Non Final Office Action Issued in U.S. Appl. No. 15/060,413", dated Sep. 12, 2017, 29 Pages.
"Non Final Office Action Issued in U.S. Appl. No. 15/060,445", dated Aug. 7, 2017, 24 Pages.
August, et al., "A Framework for Balancing Control Flow and Predication", In Proceedings of the 30th Annual IEEE/ACM International Symposium on Microarchitecture, Dec. 1, 1997, 12 Pages.
August, et al., "Architectural Support for Compiler-Synthesized Dynamic Branch Prediction Strategies: Rationale and Initial Results", In Proceedings of Third International Symposium on High-Performance Computer Architecture, Feb. 1, 1997, pp. 84-93.
Chang, et al., "Using Predicated Execution to Improve the Performance of a Dynamically Scheduled Machine with Speculative Execution", In Proceedings of the IFIP WG 10.3 working conference on Parallel architectures and compilation techniques, Jun. 1, 1995, 10 Pages.
Chuang, et al., "Predicate Prediction for Efficient Out-of-Order Execution", In Proceedings of the 17th Annual International Conference on Supercomputing., Jun. 23, 2003, 10 Pages.

Coons, et al., "Optimal Huffman Tree-Height Reduction for Instruction-Level Parallelism", In Technical Report TR-08-34, Aug. 2007, 26 Pages.
Ebcioglu, et al., "An Eight-Issue Tree-VLIW Processor for Dynamic Binary Translation", In Proceedings of the International Conference on Computer Design, Nov. 1998, 9 Pages.
Ferrante, et al., "The Program Dependence Graph and Its Use in Optimization", In Proceedings of ACM Transactions on Programming Languages and Systems, vol. 9, Issue 3, Jul. 1, 1987, 31 Pages.
Havanki, et al., "Treegion Scheduling for Wide Issue Processors", In Proceedings of the 4th International Symposium on High-Performance Computer Architecture, Feb. 1, 1998, 11 Pages.
Huh, et al., "A NUCA Substrate for Flexible CMP Cache Sharing", In Proceedings of 19th International Conference on Supercomputing, Jun. 20, 2005, 10 Pages.
Mahlke, et al., "Effective Compiler Support for Predicated Execution Using the Hyperblock", In Proceedings of the 25th Annual International Symposium on Microarchitecture, Dec. 1992, 10 Pages.
Mahlke, Scott Alan., "Exploiting Instruction Level Parallelism in the Presence of Conditional Branches", In Doctoral Dissertation Submitted in the Department of Electrical and Computer Engineering, Sep. 1996, 292 Pages.
Mai, et al., "Smart Memories: A Modular Reconfigurable Architecture", In Proceedings of the 27th International Symposium on Computer Architecture, Jun. 14, 2011, 11 Pages.
McDonald, et al., "The Design and Implementation of the Trips Prototype Chip", Retrieved From: http://www.cs.utexas.edu/-trips/talks/hotchips05.pdf :, Aug. 17, 2005, 24 Pages.
Moreno, et al., "Scalable instruction-level parallelism through tree-instructions", In Proceedings of the 11th International conference on Supercomputing, Jul. 11, 1997, 14 Pages.
Netto, et al., "Code Compression to Reduce Cache Accesses", In Technical Report—IC-03-023, Nov. 2003, 15 Pages.
Pan, et al., "High Performance, Variable-Length Instruction Encodings", In Doctoral Dissertation of Massachusetts Institute of Technology, May 2002, 53 Pages.
Parcerisa, "Design of Clustered Superscalar Microarchitectures", In Thesis Submitted to polytechnic University of Catalonia., Apr. 2004, 28 Pages.
"International Search Report and Written Opinion Issued in PCT Application No. PCT/US2016/051207", dated Dec. 16, 2016, 11 Pages.
"International Preliminary Search Report on Patentability Issued in PCT Application No. PCT/US2016/051402", dated Dec. 18, 2017, 12 Pages.
"International Preliminary Search Report on Patentability Issued in PCT Application No. PCT/US2016/051403", dated Dec. 18, 2017, 14 Pages.
"International Search Report and Written Opinion Issued in PCT Application No. PCT/US2016/051403", dated Dec. 22, 2016, 17 Pages.
"Written Opinion Issued in PCT Application No. PCT/US2016/051403", dated Aug. 29, 2017, 13 Pages.
"International Preliminary Report on Patentability Issued in PCT Application No. PCT/US2016/051404", dated Dec. 18, 2017, 13 Pages.
"International Search Report and Written Opinion Issued in PCT Application No. PCT/US2016/051404", dated Dec. 22, 2016, 18 Pages.
"Second Written Opinion Issued in PCT Application No. PCT/US2016/051404", dated May 12, 2017, 12 Pages.
Pengfei, et al., "Novel O-GEHL Based Hyperblock Predictor for Edge Architectures", In the Proceedings of IEEE Seventh International Conference on Networking, Architecture, and Storage, Jun. 28, 2012, pp. 172-180.
Pnevmatikatos, et al., "Guarded Execution and Branch Prediction in Dynamic ILP Processors", In Proceedings of the 21st Annual International Symposium on Computer Architecture, Apr. 1994, 11 Pages.
Quinones, et al., "Improving Branch Predication and Predicated Execution in Out-of-Order Processors", In Proceedings of IEEE

(56) References Cited

OTHER PUBLICATIONS

13th International Symposium on High Performance Computer Architecture, Feb. 2007, 10 Pages.
Quinones, et al., "Selective Predicate Prediction for Out-of-Order Processors", In Proceedings of the 20th Annual International Conference on Supercomputing, Jun. 28, 2006, 9 Pages.
Ranganathan, Nitya, "Control Flow Speculation for Distributed Architectures", In Dissertation presented to the faculty of the Graduate School of the University of Texas at Austin, May 2009, 40 Pages.
Ross, et al., "A Hamming Distance Based VLIW/EPIC Code Compression Technique", In Proceedings of the International conference on Compilers, architecture, and synthesis for embedded systems, Sep. 22, 2004, 8 Pages.
Sankaralingam, et al., "Universal Mechanisms for Data-Parallel Architectures", In the Proceedings of the 36th International Symposium on Microarchitecture, Dec. 3, 2003, 12 Pages.
Simon, et al., "Incorporating Predicate Information Into Branch Predictors", Proceedings of the 9th International Symposium on High-Performance Computer Architecture, Feb. 2003, 12 Pages.
Sohi, et al., "High-Bandwidth Data Memory Systems for Superscalar Processors", In Proceedings of the 4th International conference on architectural support for programming languages and operating systems Homepage, Apr. 1991, 8 Pages.
Sohi, et al., "Multiscalar Processors", In Proceedings of 22nd Annual International Symposium on Computer Architecture, vol. 23, Issue—2, Jun. 22, 1995, 12 Pages.
Sohi, Gurindar, "Retrospective: Multiscalar Processors", In Proceedings of the 25th Annual International Symposium on Computer Architectures, Jun. 27, 1998, pp. 111-114.
Uht, et al., "Disjoint Eager Execution: An Optimal Form of Speculative Execution", In Proceedings of the 28th International Symposium on Microarchitecture, Nov./Dec. 1995, 13 Pages.
Wilson, et al., "Designing High Bandwidth On-Chip Caches", In Proceedings of the 24th annual international symposium on Computer architecture, Jun., 1997, 12 Pages.
Xie, et al., "A code decompression architecture for VLIW", In Proceedings of 34th ACM/IEEE International Symposium on Microarchitecture, Dec. 1, 2001, 10 Pages.

\* cited by examiner

FIG. 5
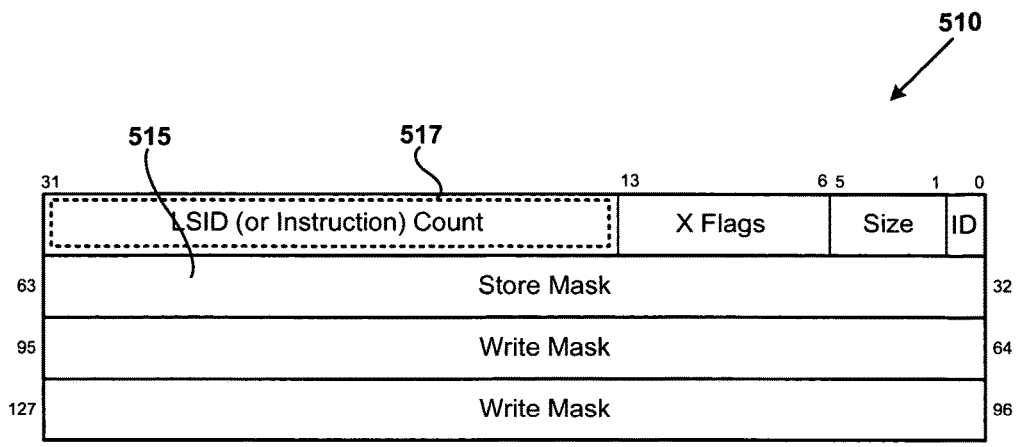
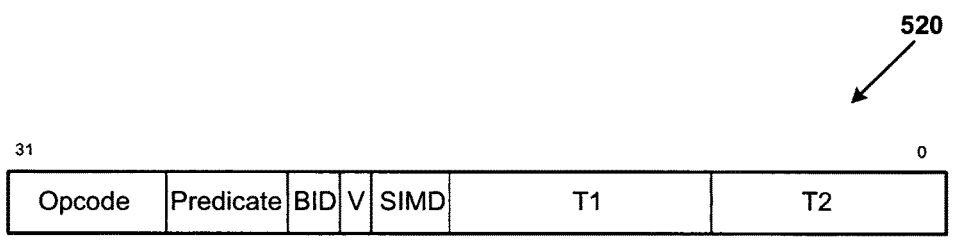
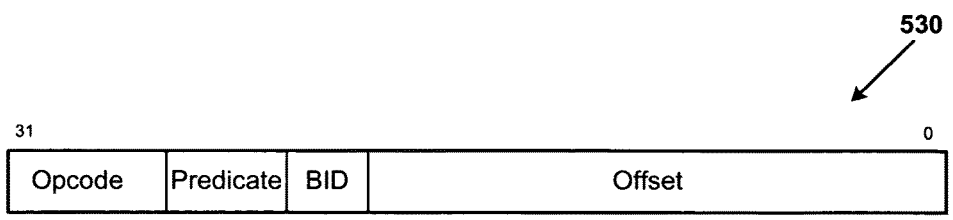
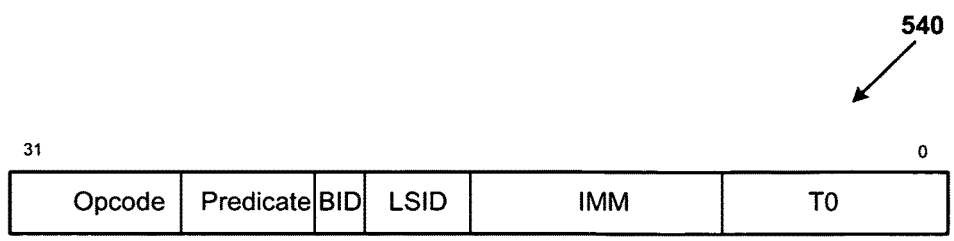

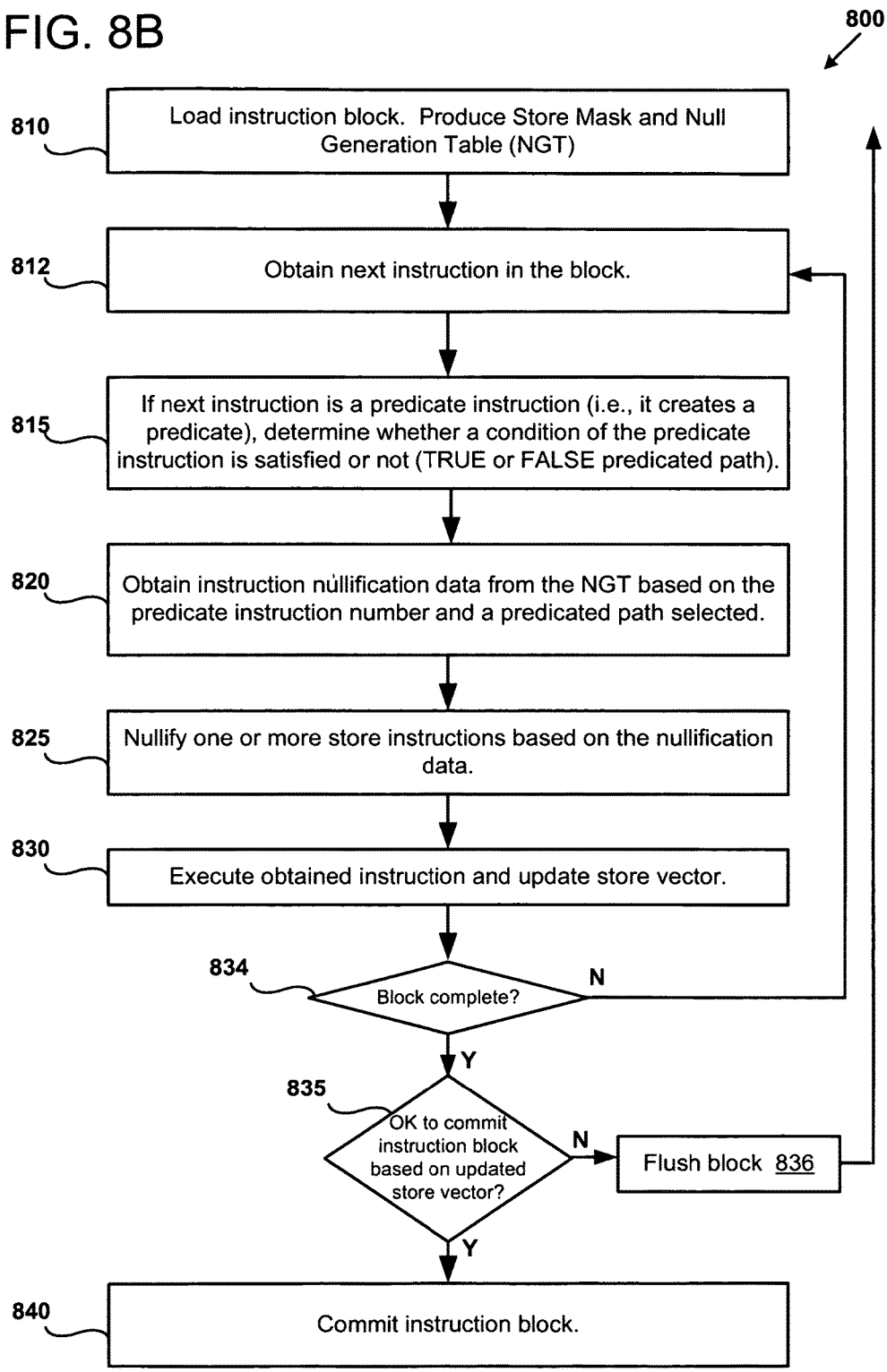

FIG. 9

```
++i;
if(a[i]>a[i+1] {
  t       = a[i];
  a[i]    = a[i+1];
  a[i+1]  = t;
}
else {
  b[i]=b[i]+1;
} b[1]  = 0xff;
x     = b[2];
```

910

```
//    opcd    src bid  lsid   target(s)
 0:   readl   R1              T[3R]              // i
 1:   readl   R2              T[3L]              // a
 2:   readl   R3              T[14L]             // b
 3:   addi    #1              B1R                // ++i
 4:   add         B1R         T[5R]   T[6R]      // &a[i] (i.e., a+i)
 5:   mov                     T[7R]   T[8R]
 6:   mov                     T[12R]  T[13R}
 7:   ld      #0       0      T[9R]              // a[i]
 8:   ld      #1       1      T[10R]             // a[i+1]
 9:   mov                     T[13L]  T[11L]     // a[i]
10:   mov                     T[12L]  T[11R]     // a[i+1]
11:   tgt                     B2P                // a[i] > a[i+1] ?
12:   sd_t        B2P 2                          // a[i]    = a[i+1]
13:   sd_t        B2P 3                          // a[i+1] = t (i.e., a[i])
14:   mov                     T[15L]  T[19R]     // b
15:   add         B1R         T[16R]  T[18R]     // &b[i]
16:   ld_f    #0  B2P 4       T[17R]             // b[i]
17:   addi_f  #1  B2P         T[18L]             // b[i]+1
18:   sd_f        B2P 5                          // b[i] = b[i]+1
19:   addi    #1              T[21R]             // &b[1]
20:   movi    #ff             T[21L]             // 0xff
21:   sd               6                         // b[1]=0xff
22:   addi #2                 T[22R]             // &b[2]
23:   ld #2            7      T[24R]             // b[2]
24:   mov                     R5                 // x=b[2]
```

920

| NULL GENERATION TABLE | | |
|---|---|---|
| Instr. # | TRUE | FALSE |
| ⋮ 11 | 0 0 0 0 0 1 0 0 | 0 0 1 1 0 0 0 0 |
| ↑ 1112 | ↑ 1114 | ↑ 1116 |

FIG. 12
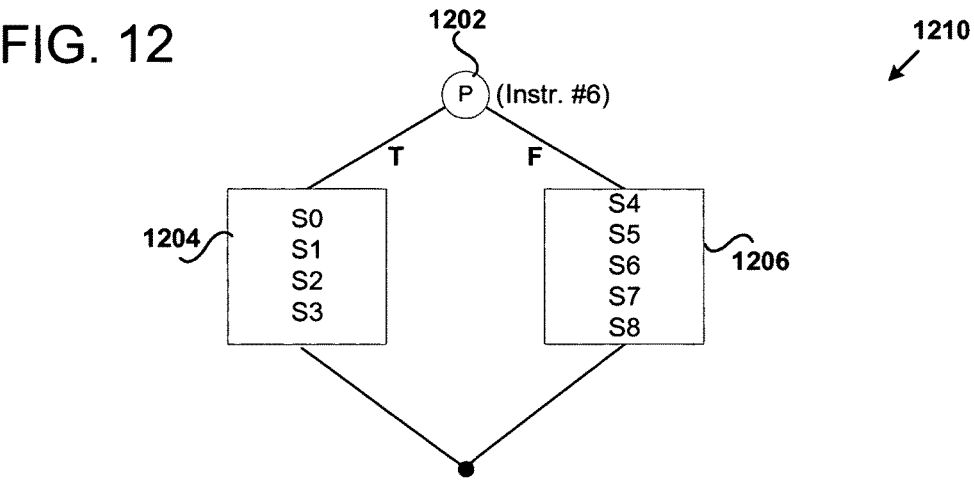
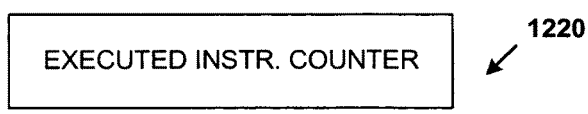
EXECUTED INSTR. COUNTER
| NULL GENERATION TABLE |||
|---|---|---|
| Instr. # | TRUE | FALSE |
| ⋮<br>6<br>⋮ | ⋮<br>4<br>⋮ | ⋮<br>5<br>⋮ |

DYNAMIC GENERATION OF NULL INSTRUCTIONS

CROSS-REFERENCE TO RELATED APPLICATIONS

This application claims the benefit of U.S. Provisional Patent Application No. 62/221,003, entitled "BLOCK-BASED PROCESSORS," filed Sep. 19, 2015, which application is incorporated herein by reference in its entirety.

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for configuring, operating, and compiling code for, block-based processor architectures (BB-ISAs), including explicit data graph execution (EDGE) architectures. The described techniques and tools for solutions for, e.g., improving processor performance and/or reducing energy consumption can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, PDAs, touch screen tablet devices, tablet computers, wearable computers, and laptop computers.

In one example of the disclosed technology, a block-based processor is configured to execute memory access instructions (e.g., memory load and memory store instructions) based on a hardware structure storing data indicating the relative ordering of the memory access instructions as well as nullification data. The nullification data can indicate one or more memory access instructions to be nullified based on whether a condition associated with a predicate instruction is satisfied. In some examples, the nullification data may also include a total number of memory access instructions (e.g., memory store instructions) that will execute when a condition associated with a predicate instruction is satisfied (or not satisfied). In this regard, one or more null instructions can be dynamically generated based on the nullification data. For example, a null store instruction can be generated to mark one or more load/store identifiers as having completed, or to increment a count of store instructions that have executed, but without performing a memory store operation, thereby changing the state of the machine as if a store instruction had executed. In some examples, a store mask and a table with the nullification data are generated when decoding an instruction block or read directly from an instruction block header and stored in the hardware structure. In some examples, the memory access instructions are encoded with an identifier indicating their relative ordering. In some examples, the block-based processor can detect (e.g., during instruction execution), a predicate instruction. The processor can retrieve nullification data associated with the predicate instruction (e.g., from a null generation table). At least a portion of the nullification data can identify at least one of the memory store instructions for nullification based on whether a condition of the predicate instruction is satisfied. The processor can control issuing of at least one of the plurality of memory load and/or memory store instructions based on the retrieved nullification data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 5 illustrates block-based processor headers and instructions, as can be used in some examples of the disclosed technology.

FIG. 8B is a flowchart outlining an example method of dynamic nullification of instructions as can be performed in certain examples of the disclosed technology.

FIG. 9 illustrates example source and assembly code as can be used in certain examples of the disclosed technology.

FIG. 12 illustrates yet another example of a null generation table as can be used in certain examples of the disclosed technology.

DETAILED DESCRIPTION

I. General Considerations

Figure 1:
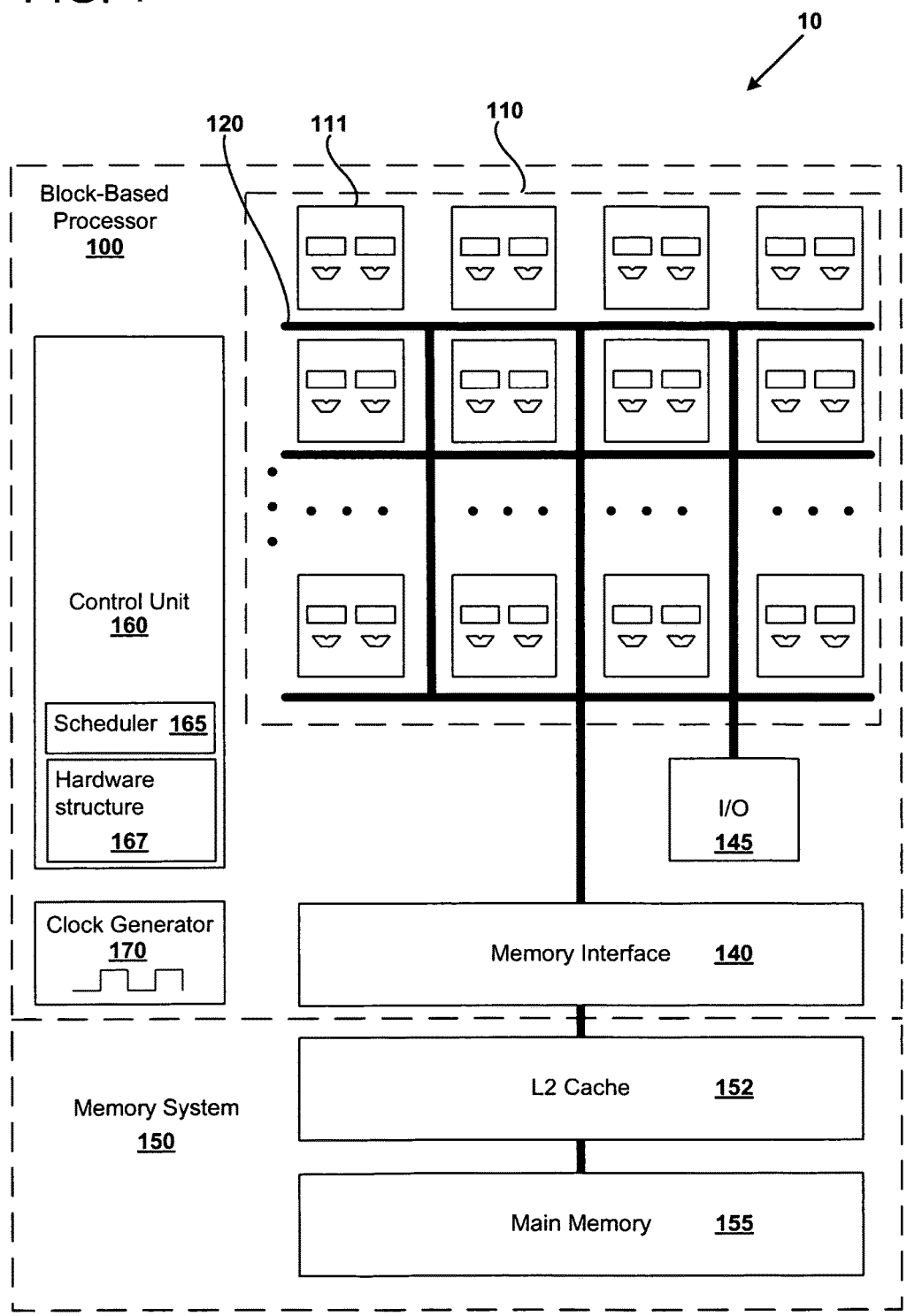
FIG. 1 illustrates a block-based processor core, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

Apparatus, methods, and computer-readable storage media are disclosed for generation and use of memory access instruction order encodings for block-based processors. In certain examples of the disclosed technology, instruction blocks include an instruction block header and a plurality of instructions. In other words, the executed instructions of the instruction block affect the state, or do not affect the state as a unit.

In some examples of the disclosed technology, a hardware structure stores data indicating an execution order to be adhered to for a number of memory access instructions, including memory load and memory store instructions. A control unit coupled to a processor core controls issuance of memory access instructions based at least in part on data stored in the hardware structure. Thus, memory read/write hazards can be avoided, while allowing for instructions in an instruction block to execute as soon as their dependencies are available. In some examples, the control unit includes wakeup and selection logic used to determine when memory instructions issue to a load/store queue.

As will be readily understood to one of ordinary skill in the relevant art, a spectrum of implementations of the disclosed technology are possible with various area and performance tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. An external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can generate and control the processor according to control flow and metadata information representing exit points and control flow probabilities for instruction blocks.

The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler 165 that is used to allocate instruction blocks to the processor cores 110. As used herein, scheduler allocation refers to directing operation of an instruction blocks, including initiating instruction block mapping, fetching, decoding, execution, committing, aborting, idling, and refreshing an instruction block. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The scheduler 165 schedules the flow of instructions including allocation and de-allocation of cores for performing instruction processing, control of input data and output data between any of the cores, register files, the memory interface 140, and/or the I/O interface 145. The control unit 160 also includes memory access instruction hardware structure 167, which can be used to store data including a store mask and a store vector register, as discussed in further detail below.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
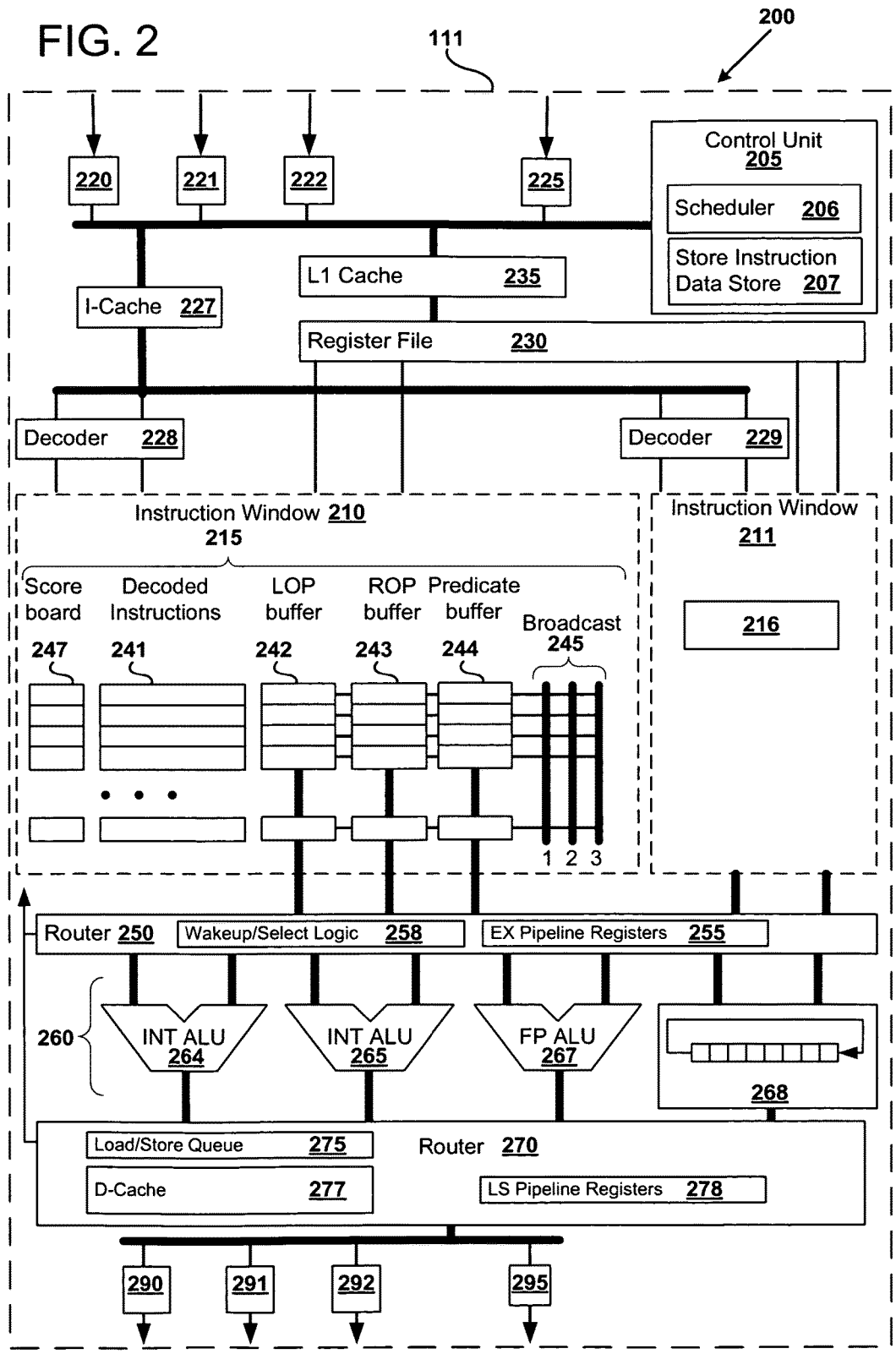
FIG. 2 illustrates a block-based processor core, as can be used in some examples of the disclosed technology.

FIG. 2 is a block diagram further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include generating and using generating and using memory access instruction encodings, allocation and de-allocation of cores for performing instruction processing, control of input data and output data between any of the cores, register files, the memory interface 140, and/or the I/O interface 145. The control unit can also control the load-store queue, scheduler, global control unit, other units, or a combination of these units used to determine the rate and order of instruction issue.

In some examples, the instruction scheduler 206 is implemented using a general-purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

The control unit 205 further includes memory (e.g., in an SRAM or register) for storing control flow information and metadata. For example, data for memory access instruction order can be stored in a hardware structure such as a store instruction data store 207. The store instruction data store 207 can store data for a store mask (e.g., generated by copying data encoded in an instruction block or by an instruction decoder when decoding instructions), a store vector register (e.g., storing data indicating which and what types of memory access instructions have executed), and masked store vector register data (e.g., data generated by applying the store mask to the store vector register). In some examples, the store instruction data store 207 includes a counter that tracks the number and type of memory access instructions that have executed.

The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 located in each respective instruction window 210 and 211. Further, each of the decoders 228 and 229 can send data to the control unit 205, for example, to configure operation of the processor core 111 according to execution flags specified in an instruction block header or in an instruction.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers can be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associate with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, a predicate buffer 244, three broadcast channels 245, and an instruction scoreboard 247. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands and predicates are read from the operand buffers 242 and 243 and predicate buffer 244, respectively, not the register file. The instruction scoreboard 247 can include a buffer for predicates directed to an instruction, including wire-OR logic for combining predicates sent to an instruction by multiple instructions.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). The control unit can fetch and decode two instructions per clock cycle into each of the instruction windows 210 and 211. The control unit 205 provides instruction window dataflow scheduling logic to monitor the ready state of each decoded instruction's inputs (e.g., each respective instruction's predicate(s) and operand(s) using the scoreboard 247. When all of the input operands and predicate(s) for a particular decoded instruction are ready, the instruction is ready to issue. The control unit 205 then initiates execution of (issues) one or more next instruction(s) (e.g., the lowest numbered ready instruction) each cycle, and control signals based on the decoded instruction and the instruction's input operands are sent to one or more of functional units 260 for execution. The decoded instruction can also encodes a number of ready events. The scheduler in the control unit 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and ready instructions can be scheduled in a first-in first-out (FIFO) order from the ready queue. For instructions encoded with load store identifiers (LSIDs), the execution order will also follow the priorities enumerated in the instruction LSIDs, or by executed in an order that appears as if the instructions were executed in the specified order.

Information stored in the scoreboard 245 can include, but is not limited to, the associated instruction's execution predicate(s) (such as whether the instruction is waiting for a predicate bit to be calculated and whether the instruction executes if the predicate bit is true or false), availability of operands to the instruction, or other prerequisites required before issuing and executing the associated individual instruction. The number of instructions that are stored in each instruction window generally corresponds to the number of instructions within an instruction block. In some examples, operands and/or predicates are received on one or more broadcast channels that allow sending the same operand or predicate to a larger number of instructions. In some examples, the number of instructions within an instruction block can be 32, 64, 128, 1,024, or another number of instructions. In some examples of the disclosed technology, an instruction block is allocated across multiple instruction windows within a processor core. Out-of-order operation and memory access can be controlled according to data specifying one or more modes of operation.

In some examples, restrictions are imposed on the processor (e.g., according to an architectural definition, or by a programmable configuration of the processor) to disable execution of instructions out of the sequential order in which the instructions are arranged in an instruction block. In some examples, the lowest-numbered instruction available is configured to be the next instruction to execute. In some examples, control logic traverses the instructions in the instruction block and executes the next instruction that is ready to execute. In some examples, only one instruction can issue and/or execute at a time. In some examples, the instructions within an instruction block issue and execute in a deterministic order (e.g., the sequential order in which the instructions are arranged in the block). In some examples, the restrictions on instruction ordering can be configured when using a software debugger to by a user debugging a program executing on a block-based processor.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. The first router 250 further includes wakeup/select logic 258, which is used to determine when memory instructions are sent to a load/store queue 275. For example, the wakeup/select logic 258 can determine if all source operands and predicate conditionals are available for a memory access instruction and based on the determination, send the address (and data, if applicable) to the load/store queue 275.

Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 include the load/store queue 275, which can be used to issue memory instructions, a data cache 277, which stores data being input to or output from the core to memory, and load/store pipeline register 278.

The load/store queue 275 receives and temporarily stores information for performing memory access instructions. The instruction block can execute all the memory access instructions as a single, atomic transactional block. In other words, either all or none of the memory access instructions are performed. The relative order in which memory access instructions is determined based on LSIDs associated with each memory access instruction (e.g., an LSID encoded with the corresponding instruction) and in some cases, the store mask. In some examples, additional performance can be obtained by executing the memory access instructions out of the LSID-specified relative ordering, but the state of memory must still appear as if the instructions were executed in order. The load/store queue 275 also receives addresses for load instructions, and addresses and data for store instructions. In some examples, the load/store queue waits to perform the queued memory access instructions until it is determined that the containing instruction block will actually commit. In other examples, the load/store queue 275 can issue at least some memory access instructions speculatively, but will need to flush the memory operations in the event the block does not commit. In other examples, the control unit 205 determines the order in which memory access instructions are executed, by providing functionalities described as being performed by the wakeup/select logic and/or load/store queue 275. In some examples, the processor 100 includes a debug mode that allows for step-by-step issuance of memory access instructions with the aid of a debugger. The load/store queue 275 can be implemented using control logic (e.g., with a finite state machine) and memory (e.g., registers or SRAM) to execute the memory transactions and store memory instruction operands, respectively.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control unit 205 of the processor cores 110. The area, clock period, capabilities, and limitations substantially determine the realized performance of the individual cores 110 and the throughput of the block-based processor 100.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some cases, the scheduler 206 accepts events for target instructions that have not yet been decoded and must also inhibit reissue of issued ready instructions. In some examples, instructions can be non-predicated, or predicated (based on a true or false condition). A predicated instruction does not become ready until it is targeted by another instruction's predicate result, and that result matches the predicate condition. If the associated predicate condition does not match, the instruction never issues. In some examples, predicated instructions may be issued and executed speculatively. In some examples, a processor can subsequently check that speculatively issued and executed instructions were correctly speculated. In some examples a misspeculated issued instruction and the specific transitive closure of instructions in the block that consume its outputs can be re-executed, or misspeculated side effects annulled. In some examples, discovery of a misspeculated instruction leads to the complete roll back and re-execution of an entire block of instructions. In some examples, the scheduler performs some or all of the operations described as being performed by the wakeup/selection logic and/or load/store queue discussed above.

Upon branching to a new instruction block, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
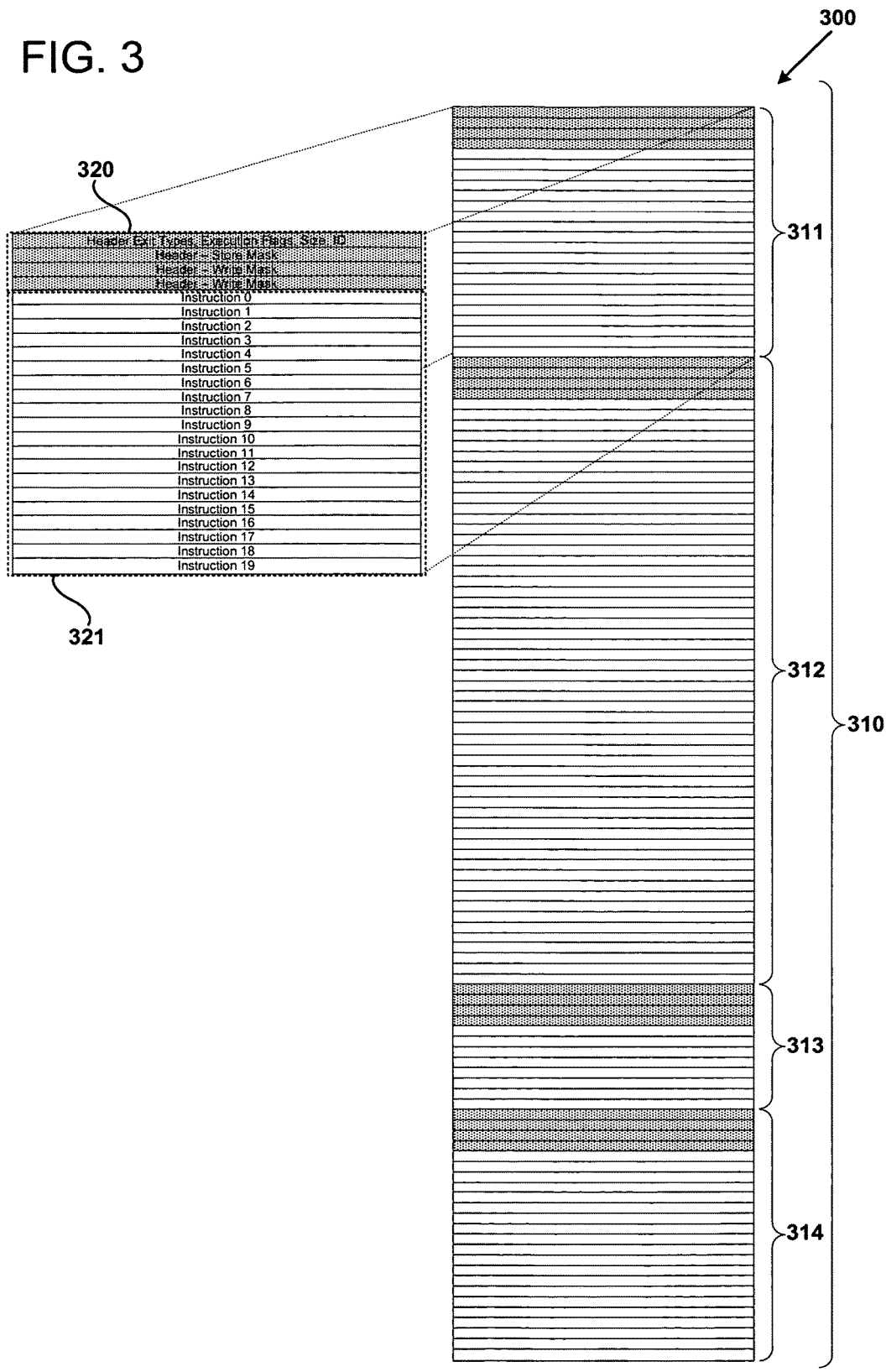
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. The stream of instructions can be stored in memory, received from another process in memory, received over a network connection, or stored or received in any other suitable manner. In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include one or more execution flags that indicate one or more modes of operation for executing the instruction block. For example, the modes of operation can include core fusion operation, vector mode operation, memory dependence prediction, and/or in-order or deterministic instruction execution.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 320 also includes a store mask that indicates which of the load-store queue identifiers encoded in the block instructions are assigned to store operations. For example, for a block with eight memory access instructions, a store mask 01011011 would indicate that there are three memory store instructions (bits 0, corresponding to LSIDs 0, 2, and 5) and five memory load instructions (bits 1, corresponding to LSIDs 1, 3, 4, 6, and 7). In some examples of the disclosed technology, the store mask may provide information only about the memory store instruction (i.e., a mask of 01011011 indicates five memory stores with LSIDs 0, 1, 3, 4, and 6, and no information about memory loads). The instruction block header can also include a write mask, which identifies which global register(s) the associated instruction block will write. In some examples, the store mask is stored in a store vector register by, for example, an instruction decoder (e.g., decoder 228 or 229). In other examples, the instruction block header 320 does not include the store mask, but the store mask is generated dynamically by the instruction decoder by analyzing instruction dependencies when the instruction block is decoded. For example, the decoder can analyze load store identifiers of instruction block instructions to determine a store mask and store the store mask data in a store vector register. Similarly, in other examples, the write mask is not encoded in the instruction block header, but is generated dynamically (e.g., by analyzing registers referenced by instructions in the instruction block) by an instruction decoder) and stored in a write mask register. The store mask and the write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 321 can include instructions for executing integer and floating-point arithmetic, logical operations, type conversions, register reads and writes, memory loads and stores, execution of branches and jumps, and other suitable processor instructions. In some examples, the instructions include instructions for configuring the processor to operate according to one or more of operations by, for example, speculative execution based on control flow and data regarding memory access instructions stored in a hardware structure, such as a store instruction data store 207. In some examples, the store instruction data store 207 is not architecturally visible. In some examples, access to the store instruction data store 207 is configured to be limited to processor operation in a supervisory mode or other protected mode of the processor.

VI. Example Block Instruction Target Encoding

Figure 4:
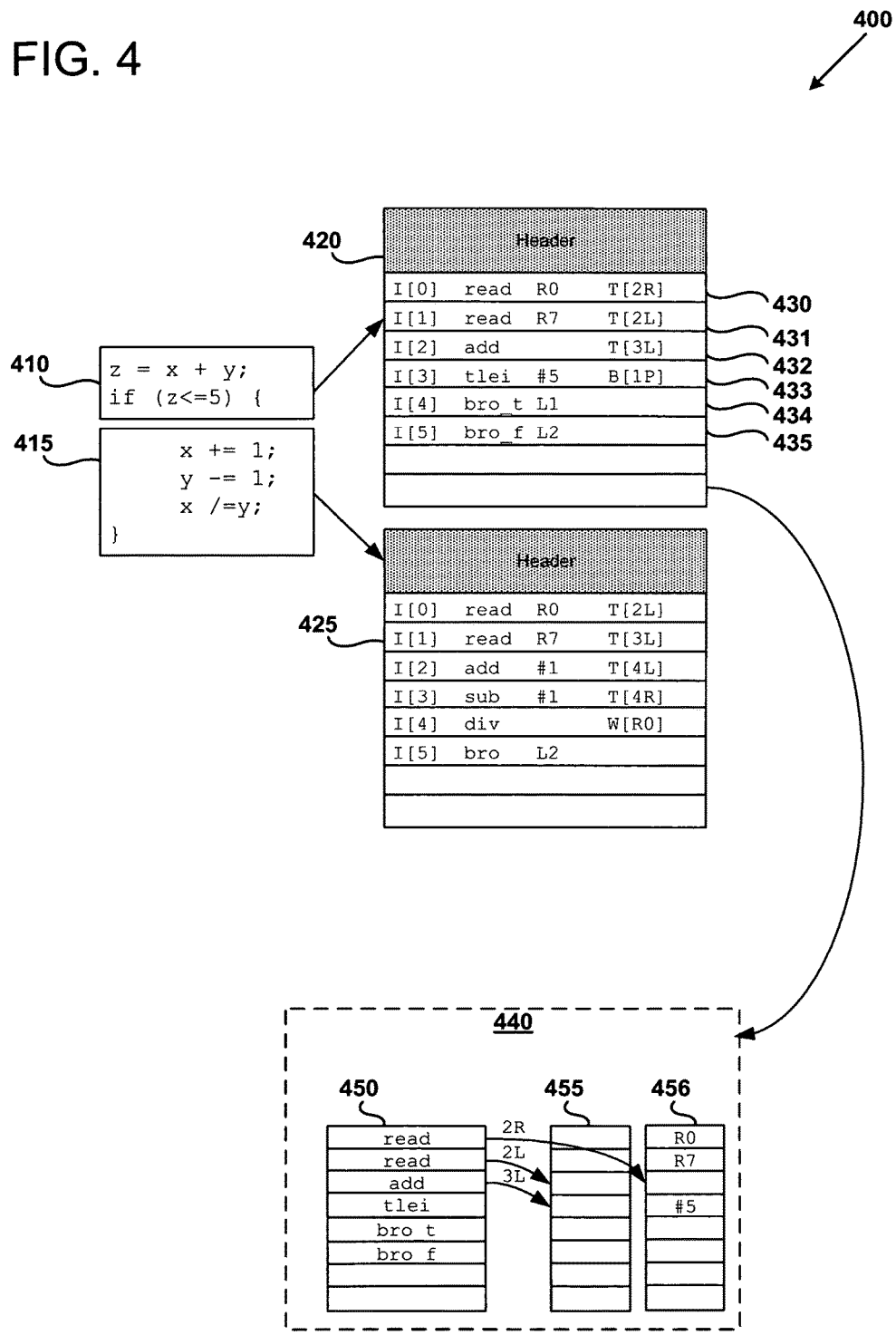
FIG. 4 illustrates portions of source code and instruction blocks, as can be used in some examples of the disclosed technology.

FIG. 4 is a diagram 400 depicting an example of two portions 410 and 415 of C language source code and their respective instruction blocks 420 and 425, illustrating how block-based instructions can explicitly encode their targets. In this example, the first two READ instructions 430 and 431 target the right (T[2R]) and left (T[2L]) operands, respectively, of the ADD instruction 432 (2R indicates targeting the right operand of instruction number 2; 2L indicates the left operand of instruction number 2). In the illustrated ISA, the read instruction is the only instruction that reads from the global register file (e.g., register file 230); however any instruction can target, the global register file. When the ADD instruction 432 receives the result of both register reads it will become ready and execute. It is noted that the present disclosure sometimes refers to the right operand as OP0 and the left operand as OP1.

When the TLEI (test-less-than-equal-immediate) instruction 433 receives its single input operand from the ADD, it will become ready to issue and execute. The test then produces a predicate operand that is broadcast on channel one (B[1P]) to all instructions listening on the broadcast channel for the predicate, which in this example are the two predicated branch instructions (BRO_T 434 and BRO_F 435). The branch instruction that receives a matching predicate will fire (execute), but the other instruction, encoded with the complementary predicated, will not fire/execute.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R0 and R7 are written into the right and left operand buffers of ADD 432, marking the left and right operands of ADD 432 "ready." As a result, the ADD 432 instruction becomes ready, issues to an ALU, executes, and the sum is written to the left operand of the TLEI instruction 433.

VII. Example Block-Based Instruction Formats

FIG. 5 is a diagram illustrating generalized examples of instruction formats for an instruction header 510, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (1sb) (bit 0) up to its most significant bit (msb) (bit 127). As shown, the instruction header includes a write mask field, a store mask field 515, a number of exit type fields, a number of execution flag fields, an instruction block size field, and an instruction header ID bit (the least significant bit of the instruction header). In some examples, the store mask field 515 is replaced or supplemented by an LSID count 517, which indicates the number of store instructions on each predicate path of the instruction block. For instruction blocks that have different numbers of store instructions on different predicate paths, one or more instructions can be nullified, and the executed count of store instructions incremented, such that each predicate path will indicate the same number of store instructions have executed at runtime. In some examples, the header 510 does not indicate either an LSID count or store mask, but the information is generated dynamically by the instruction decoder based on LSIDs encoded in individual store instructions.

The execution flag fields depicted in FIG. 5 occupy bits 6 through 13 of the instruction block header 510 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions.

The illustrated generic block instruction 520 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions that are decoded and executed.

The target fields T1 and T2 specifying the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), a load store ID field (LSID), an immediate field (IMM) offset field, and a target field. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory). The LSID field specifies a relative order for load and store instructions within a block. In other words, a higher-numbered LSID indicates that the instruction should execute after a lower-numbered LSID. In some examples, the processor can determine that two load/store instructions do not conflict (e.g., based on the read/write address for the instruction) and can execute the instructions in a different order, although the resulting state of the machine should not be different than as if the instructions had executed in the designated LSID ordering. In some examples, load/store instructions having mutually exclusive predicate values can use the same LSID value. For example, if a first load/store instruction is predicated on a value p being true, and second load/store instruction is predicated on a value p being false, then each instruction can have the same LSID value.

VIII. Example Processor State Diagram

Figure 6:
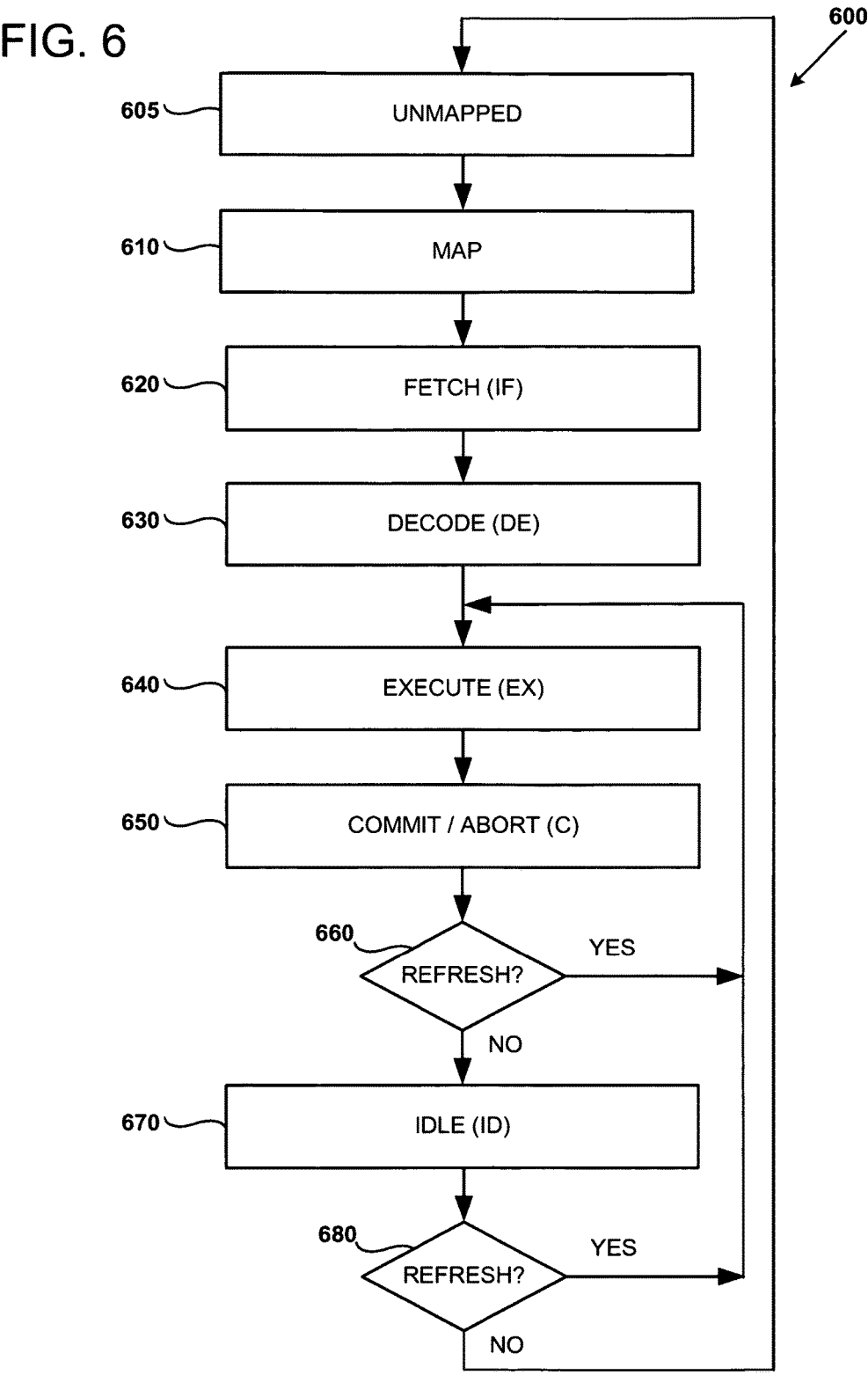
FIG. 6 is a state diagram illustrating a number of states assigned to an instruction block as it is mapped, executed, and retired.

FIG. 6 is a state diagram 600 illustrating number of states assigned to an instruction block as it is mapped, executed, and retired. For example, one or more of the states can be assigned during execution of an instruction according to one or more execution flags. It should be readily understood that the states shown in FIG. 6 are for one example of the disclosed technology, but that in other examples an instruction block may have additional or fewer states, as well as having different states than those depicted in the state diagram 600. At state 605, an instruction block is unmapped. The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 610, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to the fetch state 620.

When the instruction block is in the fetch state 620 (e.g., instruction fetch), the mapped processor core fetches computer-readable block instructions from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 630.

During the instruction decode state 630, various bits of the fetched instruction are decoded into signals that can be used by the processor core to control execution of the particular instruction. For example, the decoded instructions can be stored in one of the memory stores 215 or 216 shown above, in FIG. 2. The decoding includes generating dependencies for the decoded instruction, operand information for the decoded instruction, and targets for the decoded instruction. Once at least one instruction of the instruction block has been decoded, the instruction block can proceed to execution state 640.

During the execution state 640, operations associated with the instruction are performed using, for example, functional units 260 as discussed above regarding FIG. 2. As discussed above, the functions performed can include arithmetical functions, logical functions, branch instructions, memory operations, and register operations. Control logic associated with the processor core monitors execution of the instruction block, and once it is determined that the instruction block can either be committed, or the instruction block is to be aborted, the instruction block state is set to commit/abort 650. In some examples, the control logic uses a write mask and/or a store mask for an instruction block to determine whether execution has proceeded sufficiently to commit the instruction block. Executed memory access instructions send data and address information to a load/store queue for accessing memory. In some examples, some memory access instructions (e.g., memory load instructions) can be performed before the block executes while other instructions (e.g., memory store instructions) wait to execute until the block is committing. In some examples, all memory access instructions wait to access memory until the block is committing. In some examples, memory load and store instructions access memory during execution of the instruction block, but additional hardware catches memory hazard conditions (e.g., read after write hazards) to ensure that the main memory appears as if the instructions were executed according to their relative ordering.

At the commit/abort state 650, the processor core control unit determines that operations performed by the instruction block can be completed. For example, memory load store operations, register read/writes, branch instructions, and other instructions will definitely be performed according to the control flow of the instruction block. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Any outstanding memory access operations are also completed. Regardless of whether the instruction block has committed or aborted, the instruction block goes to state 660 to determine whether the instruction block should be refreshed. If the instruction block is refreshed, the processor core re-executes the instruction block, typically using new data values, particularly the registers and memory updated by the just-committed execution of the block, and proceeds directly to the execute state 640. Thus, the time and energy spent in mapping, fetching, and decoding the instruction block can be avoided. Alternatively, if the instruction block is not to be refreshed, then the instruction block enters an idle state 670.

In the idle state 670, the processor core executing the instruction block can be idled by, for example, powering down hardware within the processor core, while maintaining at least a portion of the decoded instructions for the instruction block. At some point, the control unit determines 680 whether the idle instruction block on the processor core is to be refreshed or not. If the idle instruction block is to be refreshed, the instruction block can resume execution at execute state 640. Alternatively, if the instruction block is not to be refreshed, then the instruction block is unmapped and the processor core can be flushed and subsequently instruction blocks can be mapped to the flushed processor core.

While the state diagram 600 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

IX. Example Block-Based Processor and Memory Configuration

Figure 7:
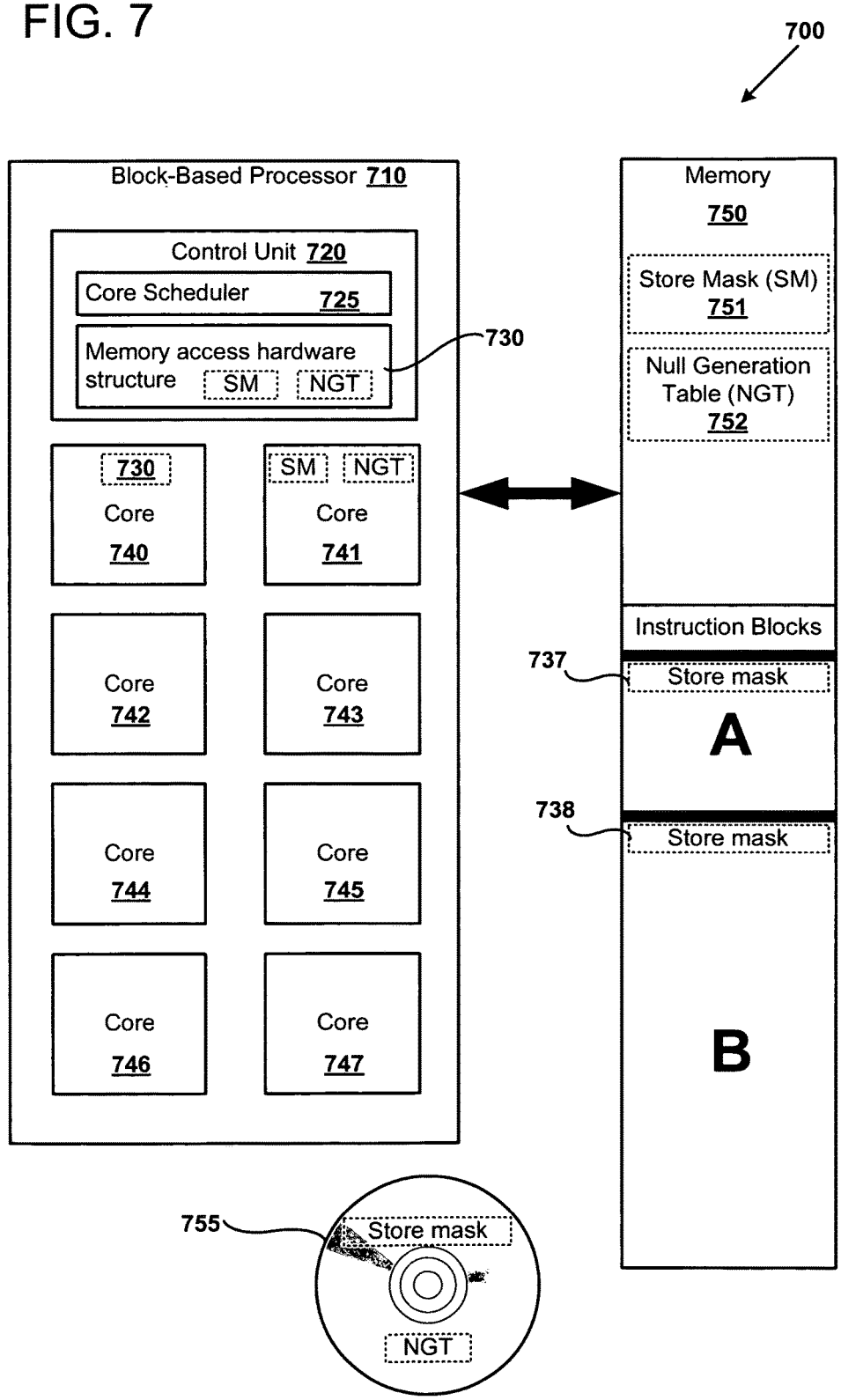
FIG. 7 illustrates a number of instructions blocks and processor cores, as can be used in some examples of the disclosed technology.

FIG. 7 is a diagram 700 illustrating an apparatus comprising a block-based processor 710, including a control unit 720 configured to execute instruction blocks according to data for one or more operation modes. The control unit 720 includes a core scheduler 725 and a memory access hardware structure 730. The core scheduler 725 schedules the flow of instructions including allocation and de-allocation of cores for performing instruction processing, control of input data and output data between any of the cores, register files, memory interfaces and/or I/O interfaces. The memory access hardware structure 730 stores data including, for example, store mask data, store vector register data indicating which instructions have executed, a null generation table (NGT), and/or control flow data. The memory access hardware structure 730, including the store vector register, can be implemented using any suitable technology, including SRAM, registers (e.g., including arrays of flip-flops or latches), or other suitable memory technology. The store mask (SM) can be generated when decoding instructions by the control unit 720. In some examples, the store mask is read from the memory 750 (e.g., store mask 751), from instruction block headers (e.g., store masks 737 and 738), or in a computer-readable storage medium, such as a storage media disc 736.

The null generation table 752 can also be generated by the control unit 720, at the time the instructions for the instruction block are decoded. Example NGTs are discussed in greater detail in reference to FIGS. 8A, 11, and 12. The NGT can include data used during dynamic nullification of instructions in instances when, e.g., one or more memory access instructions are associated with a condition of a predicated instruction, and one or more of the memory access instructions have to be nullified so that the predicated instruction can issue. As seen in FIG. 7, the NGT and the SM can be stored within one or more of the cores 740-747. In this regard, the memory access hardware structure 730 (which can also store the NGT and the SM) can also be implemented within one or more of the cores 740-747.

The block-based processor 710 also includes one or more processor cores 740-747 configured to fetch and execute instruction blocks. The illustrated block-based processor 710 has up to eight cores, but in other examples there could be 64, 512, 1024, or other numbers of block-based processor cores. The block-based processor 710 is coupled to a memory 750 which includes a number of instruction blocks, including instruction blocks A and B, and to a computer-readable storage media disc 755.

X. Example Null Generation Table Used with Predicated Instructions

Figure 8A:
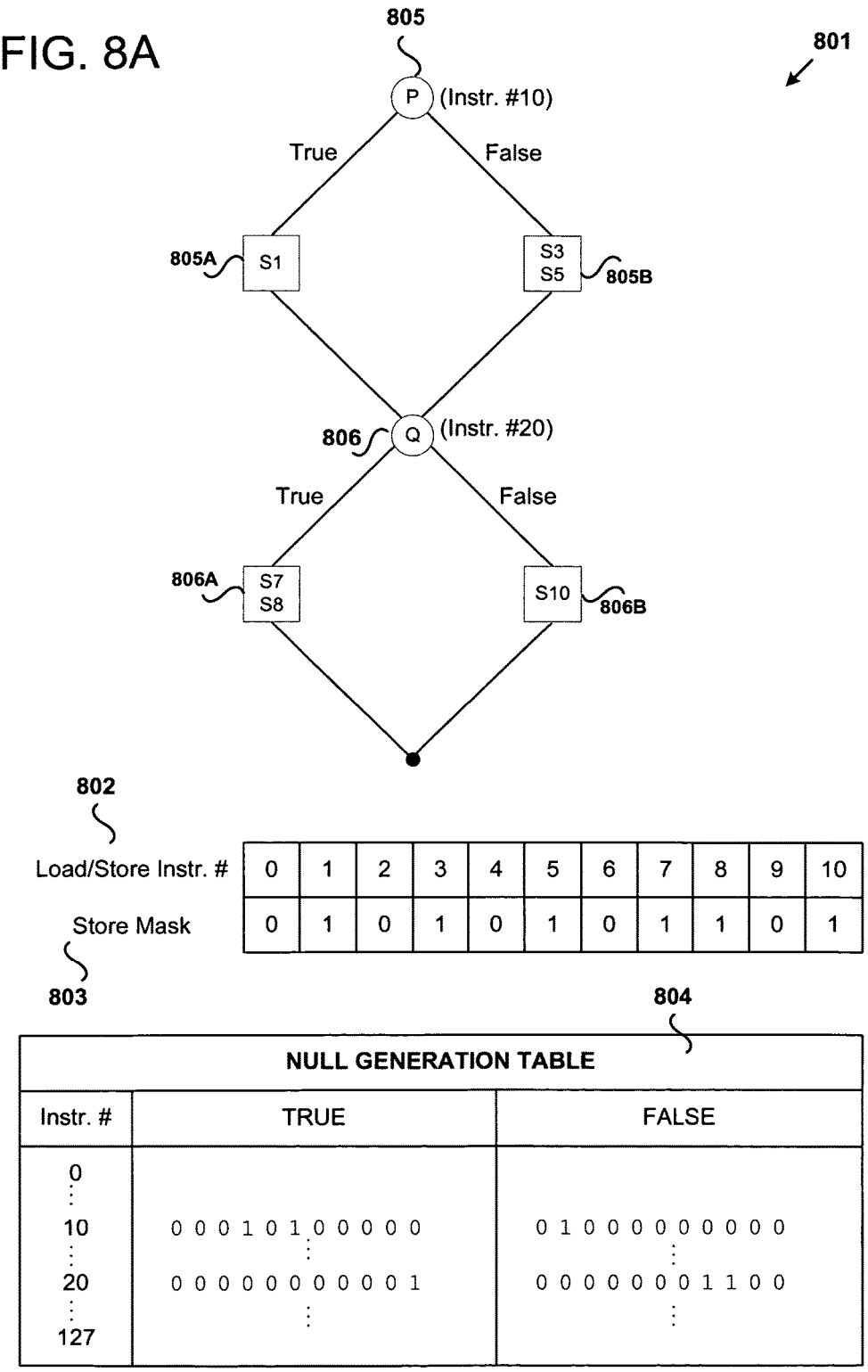
FIG. 8A illustrates an example null generation table as can be used in certain examples of the disclosed technology.

FIG. 8A illustrates an example null generation table as can be used in certain examples of the disclosed technology. Referring to FIG. 8A, there is illustrated a dependency graph 801 for two predicate instructions, P and Q. The predicate instructions P (805) and Q (806) can be part of an instruction block, each one having an instruction number (e.g., predicate instruction P may be instruction number (or "instruction #") 10 and predicate instruction Q may be instruction # 20 within the instruction block). An example predicate instruction (i.e., an instruction that creates a predicate) can be seen as instruction # 11 in FIG. 9.

As used herein, the term "predicate instruction" refers to an instruction that creates a condition/predicate (e.g., a predicate operand) that is communicated via an operand buffer, a broadcast channel, or any other delivery mechanism. As used herein, the term "predicated instruction" refers to an instruction that receives a predicate (which may be via an operand buffer, a broadcast channel, or any other delivery mechanism), and the instruction execution is predicated upon the condition (or predicate) being True or False.

For example, each of the predicate instructions P and Q has an associated condition (or predicate) (e.g., x>0), which can be evaluated to a Boolean True or False value (e.g., a True value can be represented by a "1" bit and a False value can be represented by a "0" bit, or vice versa). Accordingly, one or more instructions (e.g., memory access instructions such as memory Store instructions) may be executed on one of the True or False arms of the predicate, depending on whether the condition of the predicate instruction is satisfied or not. For example and in reference to predicate instruction P, if the condition (or predicate) for instruction P is satisfied, then instructions on the True arm may be executed, and if the condition is not satisfied, then instructions on the False arm may be executed. As seen in FIG. 8A, the True arm of instruction P includes a store instruction S1 in code portion 805A, and the False arm of instruction P includes store instructions S3 and S5 in code portion 805B. Similarly, the True arm of instruction Q includes store instructions S7 and S8 in code portion 806A, and the False arm of instruction Q includes store instruction S10 in code portion 806B.

The ordering of the memory access instructions by LSID is illustrated at 802, and the corresponding store mask is illustrated at 803. The store mask 803 May use "dense" identifiers and may indicate a memory store instruction with a "1" bit, and a memory load instruction with a "0" bit in the mask. In an example embodiment, the store mask 803 may use "non-dense" identifiers, where the mask only indicates/identifies the memory stores (and it does not identify the memory loads). Even though FIG. 8A illustrates an 11-bit mask, this is an example, and larger store masks may be used based on the number of memory access instructions in a given instruction block. In an example embodiment, a 32-bit store mask may be used, corresponding to a maximum of 32 store memory accesses (e.g., memory store instructions) in an instruction block. The store mask 803 may be 01010101101, which indicates that memory access instructions with LSIDs 1, 3, 5, 7, 8, and 10 are memory store instructions.

During execution of the predicate instructions P and Q, only one of the corresponding True or False arms of each instruction is taken, depending on whether the condition associated with the predicate instruction is satisfied (i.e., True arm) or not satisfied (i.e., False arm). In this regard, only instructions in one of the two arms of each predicate instruction will subsequently execute. However, since all memory access instructions (e.g., store instructions) in a given instruction block are accounted for in the store mask, unexecuted memory access instructions (e.g., memory store instructions in the opposite, non-selected path of the predicate instruction) may result in the instruction block not being able to commit. Therefore, unexecuted instructions, such as the instructions in a non-selected arm of predicate instructions, have to be nullified in order for the predicate instruction (and subsequently, the entire instruction block) to commit.

The null generation table (NGT) 804 can be used for purposes of dynamic instruction nullification. More specifically, at instruction decode time, the control unit (e.g., 720) can scan through the instructions in the instruction block and may determine the store mask 803, based on, e.g., the available memory access instructions (such as memory store and memory load instructions) in the block. The control unit can also scan through the decoded instructions and determine which instructions are associated with a predicate, and for each of the predicate instructions, determine which instructions in the corresponding True and False arms are store instructions. The NGT 804 can be generated so that it is indexed by an instruction number, and has a mask value for each of the True and False arms of a predicate instruction where the mask value indicates which store instructions have to be nullified in order for the predicate instruction to issue. For example, predicate instruction P may be indexed as instruction #10. A mask 00010100000 may be entered in the "True" column of the NGT 804 for instruction P, indicating that store instructions S3 and S5 (located in the opposite, False arm of the predicate) have to be nullified in instances when the True arm is selected. In this regard, if the True arm of instruction P is selected, after instruction S1 is executed, store instructions S3 and S5 may be nullified dynamically based on the 00010100000 mask (for instruction #10) in the True column of the NGT 804.

Similarly, a mask 01000000000 may be entered in the "False" column of the NGT 804 for instruction P, indicating that store instruction S1 (located in the opposite, True arm of the predicate instruction P) has to be nullified in instances when the predicate condition is not satisfied and the False arm is selected. In this regard, if the False arm of instruction P is selected, after instructions S3 and S5 are executed, store instruction S1 may be nullified dynamically based on the 01000000000 mask (for instruction #10) in the False column of the NGT 804. Corresponding nullification mask entries in the True and False columns of NGT 804 are listed for the second predicate instruction, instruction Q (which is listed as instruction #20 in the table). Even though NGT 804 is illustrated with 128 instruction entries, the size of the NGT may vary according to implementation.

In instances when one or more store instructions are dynamically nullified, a store vector may be updated so that it reflects the nullified instructions as executed (along with any other executed instructions). The store vector may be monitored and upon completion of all memory access instructions, an instruction block may be committed.

XI. Example Method of Dynamic Nullification of Instructions

FIG. 8B is a flowchart 800 outlining an example method of dynamic nullification of instructions as can be performed in certain examples of the disclosed technology. For example, the block-based processor 100 of FIG. 1, including the block-based processor core 111 described above in FIG. 2, can be used to perform the outlined method. In some examples, an execution unit of a block-based processor is configured to execute memory access instructions in an instruction block and a hardware structure stores nullification data (e.g., a null generation table), data indicating execution ordering of at least some of the memory access instructions (e.g., store mask and a store vector), and a control unit of the block-based processor is configured to control issuing of the memory access instructions to the execution unit based at least in a part on the hardware structure data.

At process block 810, an instruction block is loaded for execution, and a store mask is produced for the currently executing block of instructions. The store mask includes data that indicates which of a number of memory access instructions are store instructions. For example, a one ("1") can be stored at a bit corresponding to store instructions having a particular load store identifier (LSID) associated with a memory store instruction, and a zero ("0") can be stored for LSIDs associated with a memory load instruction. As used herein, memory load and store instructions refer to processor instructions that operate on memory, while read and write instructions refer to register reads and writes, for example reads and writes to and from a register file. The store mask can be stored in a register accessible by the control unit of a block-based processor core. In other examples, the store mask is stored in a small memory, or stored using other suitable techniques.

The store mask can be produced in any suitable fashion. In some examples, the store mask is produced by reading a store mask that is encoded in an instruction block header by a compiler that generates the instruction block. In some examples, the store mask is produced from a memory location that stores a previously generated store mask. For example, a binary file for a block-based processor program can include a section storing store masks for any number of instruction blocks in the program. In some examples, a previously generated store mask is cached from a previous execution of the instruction block, and does not need to be regenerated for subsequent instances of the instruction block. The previously generated store mask may be based on one or more store instructions associated with a specific result (e.g., True or False) for a condition of a predicate instruction. During execution of the instructions in the block, however, the condition of the predicate instructions may have a different result (i.e., if the previous store mask was determined using the store instructions in the True arm, the current execution of the instructions resulted in taking the False arm of the predicate instructions). In this instance, the previously generated store mask will be incorrect as the instruction execution has taken a path that is different from the path taken when the previous store mask was calculated.

In accordance with an example embodiment of the disclosure, the processor may generate a store mask by calculating a most likely path of execution based on past executions of the instruction block (e.g., by tracking and logging data of past execution paths). The processor may receive a count of operations (e.g., writes and stores) on the predicted path, and then only assigns the LSIDs to the predicted path, building the store mask accordingly. If other than the predicted path is taken in execution of the block, the processor flushes the block.

In some examples, the store mask is produced by generating a new store mask when decoding instructions of an instruction block. For example, as each load instruction and store instruction is decoded by the instruction decoder, the LSID field is extracted and an appropriate bit in a store mask can be set to indicate whether the LSID corresponds to a load or store instruction. In some examples, more than one bit is used to encode and LSID in the store mask, for instance in the case of don't cares or empty LSIDs. Once a store mask has been produced, the method proceeds to process block 812. In some examples, the store mask is generated from a previous instance of executing its instruction block. In some examples, is generated by an instruction decoder that decodes the memory access instructions.

At process block 812, a next instruction may be obtained, for decoding, issuance, and execution. At process block 815, it may be determined that the obtained instruction is a predicate instruction that creates a predicate (e.g., instruction P in FIG. 8A). The predicate instruction may have a condition associated with it, and it may be determined whether the condition is satisfied or not (e.g., whether the True or False side of the predicate will be taken). As an example, the condition of predicate instruction P may be satisfied, and the instructions on the True side may be obtained for execution (e.g., instruction S1).

At process block 820, nullification data may be obtained from the null generation table (NGT) 804. For example, the mask in the True column for predicate instruction P (instruction # 10) indicates that store instructions S3 and S5 should be nullified. At process block 825, the store instructions indicated by the NGT 804 (e.g., instructions S3 and S5) are dynamically nullified.

At process block 830, the obtained instruction can be executed and a store vector can be updated. In some examples, a memory load or memory store instruction is selected to execute based at least in part on LSIDs encoded within the block of instructions and a store vector register storing data indicating which of the memory store instructions have executed. Thus, the instruction can proceed with execution as its memory dependencies have been met.

A store vector can have a bit corresponding to each LSID within an instruction block. When a load or store instruction with an encoded LSID executes, then the corresponding bit in the store vector is set. Thus, the store vector can indicate which memory access instructions in an instruction block have executed. In other examples, other techniques can be used to update a store vector, for example a counter can be used instead of a store vector, as discussed in further detail below. It should be noted that in some examples, the LSID is unique to each instruction in the block. In other words, each LSID value can only be used once within an instruction block. In other examples, the same LSID can be encoded for two or more instructions, for example, in the case of predicate instructions. Thus, a set of instructions predicated on a true condition can overlap some or all of their LSIDs with corresponding instructions predicated on a false value. Once the store vector is updated, the method proceeds to process block 834.

At process block 834, it may be determined whether all instructions have been executed and the block is complete. If the block is not complete, processing may resume at block 812 when the next instruction is obtained for processing. If the block is complete, at 835, it may be determined whether the instruction block may be committed based on, e.g., the updated store vector. For example, if the store vector indicates that all store instructions that have been assigned LSIDs have executed, then the instruction block can be committed. If at process block 835 it is determined that the instruction block cannot be committed, then the block may be flushed (at 836) and processing may start again at 810. At process block 840, the instruction block can be committed.

In some examples of the method outlined in the flow chart 800, a block-based processor core includes an instruction unit configured to execute an instruction block encoded with a plurality of instructions where each of the instructions, including memory access instructions, can issue based upon receiving dependencies specified for the respective instruction. The processor core further includes a control unit configured to control the issuing of memory load and/or memory store instructions in the instruction block to execution units based at least in part on data stored in a hardware structure indicating a relative ordering of loads and stores within the instruction block. In some examples, the hardware structure can be a store mask, a content addressable memory (CAM) or a lookup table. In some examples, data is stored in the hardware structure that was generated from a previous instant of executing the instruction block. In some examples, the data is stored in the hardware structure from data decoded from an instruction block header for the instruction block. In some examples, the control unit includes a store vector register for storing data indicating which of the memory access instructions (e.g., memory load and/or memory store instructions) have executed. In some examples, the processor core control unit is configured to prevent commitment of the instruction block until the store vector indicates that all of the memory access instructions have executed.

In some examples, the processor control unit includes a counter that is updated (e.g., incremented) when a memory load or memory store instruction is executed and the instruction block is indicated to be completed when the counter reaches a predetermined value for a number of memory access instructions. In some examples, the processor core is configured to execute predicated instructions, including predicated memory access instructions. An example embodiment of the disclosure using an instruction counter is described herein below in reference to FIG. 12.

XII. Example Source and Object Code

FIG. 9 illustrates an example of source code 910 and corresponding assembly code 920 for a block-based processor as can be used in certain examples of the disclosed technology. The source code 910 includes an if/else statement. Statements within each portion of the if/else statement include a number of memory reads and memory writes to arrays A and B. When the source code 910 is transformed to object code, a number of load and store assembly instructions will be generated.

The assembly code 920 for the source code portion 910 includes 25 instructions numbered 0 through 24. The assembly instructions indicate a number of fields for example an instruction op code pneumonic, a source data specified by the instruction, for example, broadcast identifiers or immediate arguments, load store ID identifiers, and target designations. The assembly code includes register read instructions (0-3) a register write instruction (instruction 24), arithmetic instructions (e.g., instructions 3 and 4), and move instructions for sending data to multiple targets (e.g., move instructions 5 and 6). The assembly code 920 also includes a test instruction 11, which is a test if greater than instruction that will generate a predicate value on broadcast channel 2. Further, the assembly code includes two unpredicated memory load instructions 7 and 8, and one predicated load instruction 16. Load instruction 23 is also not predicated. The assembly code 920 also includes a number of memory store instructions, which will store data to a memory address, for example, predicated store instructions 12, 13, and 18, as well as unpredicated store instruction 21. As shown in the assembly code 920, each of the load and store instructions has been assigned a unique LSID. For example load instruction 7 is assigned to LSID 0, load instruction 8 is assigned to LSID 1, and predicated store instruction 12 is assigned to LSID 2. The LSIDs indicate a relative ordering in which the instructions are to be executed. For example, instructions 12 and 13 are dependent on load instructions 7 and 8 executing first. This order is enforced, as the load instructions 7 and 8 are used to generate values that will be stored by the store instructions 12 and 13. In some examples, two or more load store instructions can share an LSID. In some examples, the LSIDs are required by an instruction set architecture to be contiguous, while in other examples, the LSIDs can be sparse (e.g., intermediate LSID values are skipped). It should also be noted that in some examples, speculative or out-of-order execution of instructions in a block can be performed, but the processor must still maintain semantics as if the memory dependencies specified by the LSID was not violated.

The assembly code portion 920 can be converted to machine code for actual execution by a block-based processor.

XIII. Example Control Flow Graph

Figure 10:
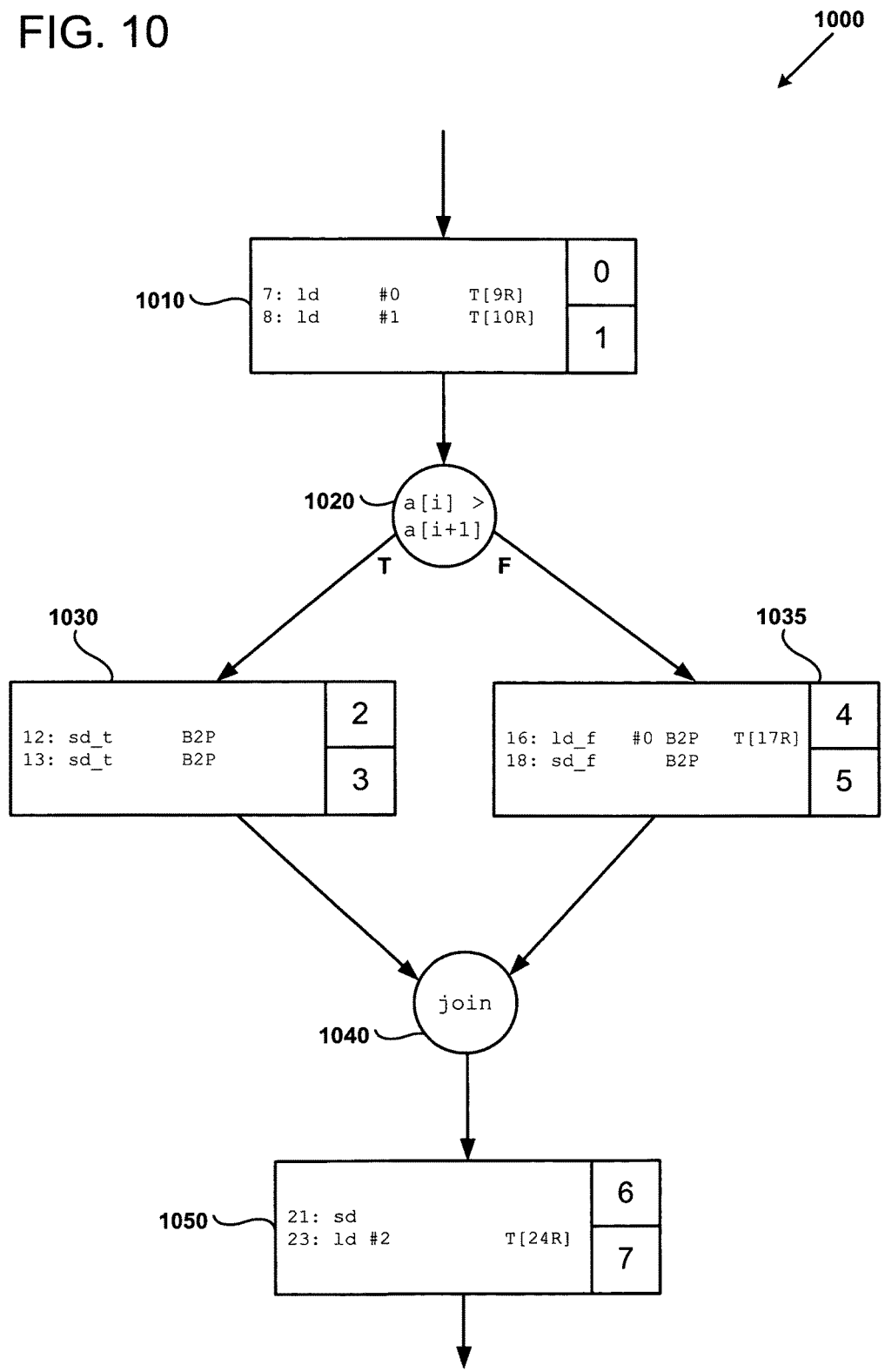
FIG. 10 illustrates an example control flow graph and load store identifiers as can be used in certain examples of the disclosed technology.

FIG. 10 illustrates a control flow graph 1000 generated for the assembly code 920 described above regarding FIG. 9. The control flow graph 1000 is depicted in a graphical form for ease of illustration including nodes and edges, but can be represented in other forms, as will be readily apparent to one of ordinary skill in the relevant art. For ease of explanation, only load and store instructions from the assembly code 920 are shown in the control flow graph, but it should be understood that other instructions will be placed or referenced by nodes of the control flow graph according to each respective instruction's dependencies and predicates.

As shown, the first node 1010 includes load instructions 7 and 8, which are associated with LSIDs 0 and 1, respectively. Instructions 7 and 8 are unpredicated and can issue and execute as soon as their operands are available. For example, assembly code move instruction 5 sends the memory address associated with a [i] to move instruction 5, which in turn sends the address to load instruction 7. Load instruction 7 can execute as soon as the address is available. Other instructions, such as read instructions 0 through 2, can also be executed without reference to a predicate.

If node 1020 is generated because of the conditional instruction 11, which generates a Boolean value by comparing two values (e.g., a test for one operand greater than another). If the left operand of the test instruction is larger than the predicate conditional value is true, and only instructions for code portion 1030 will execute. Conversely, if the conditional value is false, then the code portion 1035 will execute. In the disclosed block-based processor architecture, this can be performed without the use of branches or jumps because the associated instructions are predicated. For example, instruction 12 is a store instruction that is predicated on broadcast channel 2, which was generated by test instruction 11. Similarly, instruction 16 will execute if the broadcast predicated value is false. The store instructions in code portion 1030 are associated with LSIDs 2 and 3, while the load and store instructions in code portion 1035 are associated with LSIDs 4 and 5. As each of the instructions executes, a store vector is updated to indicate that the instruction has executed. Additionally, nullification data may be used to nullify one or more of the store instructions from code portion 1030 or 1035 based on whether the condition associated with predicate instruction in node 1020 is satisfied or not.

The control flow graph 1000 also includes a join node 1040, which represents the transition back to statements contained outside of the if/else statement of the source code 910. For example, instructions 21 and 23 of code portion 1050 are placed past the if/else statement. Instructions 21 and 23 have LSIDs 6 and 7 as shown. It should be noted that the compiler that generated the assembly code 920 did not place the memory access instructions 21 and 23 with code portion 1010 because they might be dependent on values generated within code portions 1030 or 1035. For example, load instruction 23 reads from the array b at index 2, which may or may not be written by store instruction 18 of code portion 1035. It should be noted that although the memory access instructions are executed according to the relative ordering encoded by the LSIDs, that the instructions will also wait for other dependencies before issuing.

XIV. Example Null Generation Table

Figure 11:
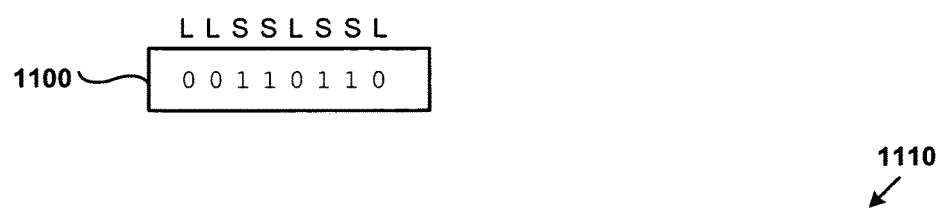
FIG. 11 illustrates another example of a null generation table as can be used in certain examples of the disclosed technology.

FIG. 11 illustrates another example of a null generation table as can be used in certain examples of the disclosed technology. Referring to FIG. 11, the store mask 1100 is associated with the memory access instructions identified with LSIDs 0-7 in the assembly code 920. More specifically, the store mask 1100 can be represented as 00110110, with each "0" bit indicating a memory load instruction and each "1" bit indicating a memory store instruction.

For the predicate instruction in node 1020 (i.e., instruction number 11 listed in the assembly code 920), memory access instructions in code portion 1030 will execute if the predicate (or condition (a[i]>a[i+1]) is satisfied, and memory access instructions in code portion 1035 will execute if the condition is not satisfied. Accordingly, during execution of memory access instructions on one side of the predicate (e.g., memory store instructions 12/13 or 18), memory store instructions on the opposite side of the predicate may be dynamically nullified so that the predicate instruction can issue and the instruction block can ultimately commit. In this regard, a null generation table (NGT) 1110 can be generated and used during the dynamic nullification of store instructions. The NGT 1110 can be indexed by instruction number (e.g., column 1112), and can include nullification data used to nullify instructions when a condition of a predicate instruction is satisfied (e.g., column 1114) or when the condition is not satisfied (e.g., column 1116).

For the concrete example of predicate instruction number 11 listed in node 1020, the nullification data when the condition is satisfied indicates a mask 00000100, which corresponds to a memory access instruction with an LSID 5 (i.e., store instruction number 18 in code block 1035 on the opposite False arm of the predicate). Similarly, the nullification data when the condition is not satisfied indicates a mask 00110000, which corresponds to memory access instructions with LSIDs 2 and 3 (i.e., store instruction number 12 and 13 in code block 1030 on the opposite True arm of the predicate). The corresponding memory store instructions indicated by the nullification data from NGT 1110 can be nullified dynamically and a store vector may be adjusted to indicate such nullified instructions as executed.

A nullification (e.g., a NULL) instruction does not change the state of the processor, other than being used to adjust a store vector or a counter in order to indicate that the next memory access instruction is ready to issue. For example, if the predicate at node 1030 is taken, then there will be two store instructions issued (instructions 12 and 13). However, a store mask would also include the store instruction in node 1035 (instruction # 18), and if node 1030 is taken then instruction number 18 in node 1035 has to be nullified to balance the load store IDs indicated in the store mask and the store vector. In other examples, the unbalanced condition can be identified by the processor control unit and the LSID can be automatically nullified, without the use of the null instruction.

XV. Example Null Generation Table Based on Instruction Count

FIG. 12 illustrates yet another example of a null generation table as can be used in certain examples of the disclosed technology. Referring to FIG. 12, there is illustrated a dependency graph 1210 for a predicate instruction P 1202 (e.g., instruction # 6 in an instruction block). The predicate instruction includes four memory store instructions (S0-S3 in code block 1204) in the True arm of the predicate, and five memory store instructions (S4-S8 in code block 1206) in the False arm of the predicate. A null generation table (NGT) 1230 may be generated where the True and False columns indicate a total number of instructions in the corresponding predicate arm, instead of identifying store instructions in the opposite arm for nullification. In this regard, NGT 1230 indicates a total of 4 instructions in the True column and a total of 5 instructions in the False column.

During instruction execution and after the condition of instruction P is determined (i.e., whether the instructions on the True or False side will execute), the NGT 1230 can be accessed and the corresponding total number of instructions from the True or False column can be loaded into the instruction counter 1220. For example, if the True condition of predicate instruction P is satisfied, then the value of 4 is loaded into instruction counter 1220. After the total number of instructions is loaded into counter 1220, execution of instructions in the True arm of the predicate can take place, adjusting the counter after each instruction execution. More specifically, instructions S0-S4 can be executed, with the counter 1220 counting down from 4 to 0. When the counter 1220 has reached 0, processing may proceed to a subsequent instruction. In this regard, by using the total instruction information from the NGT 1230, loading this information into an instruction counter 1220, and adjusting the counter after each instruction is executed, there will be no need to perform nullification of instructions from the opposite (non-selected) side of the predicate.

XVI. Example Method of Dynamic Nullification

Figure 13:
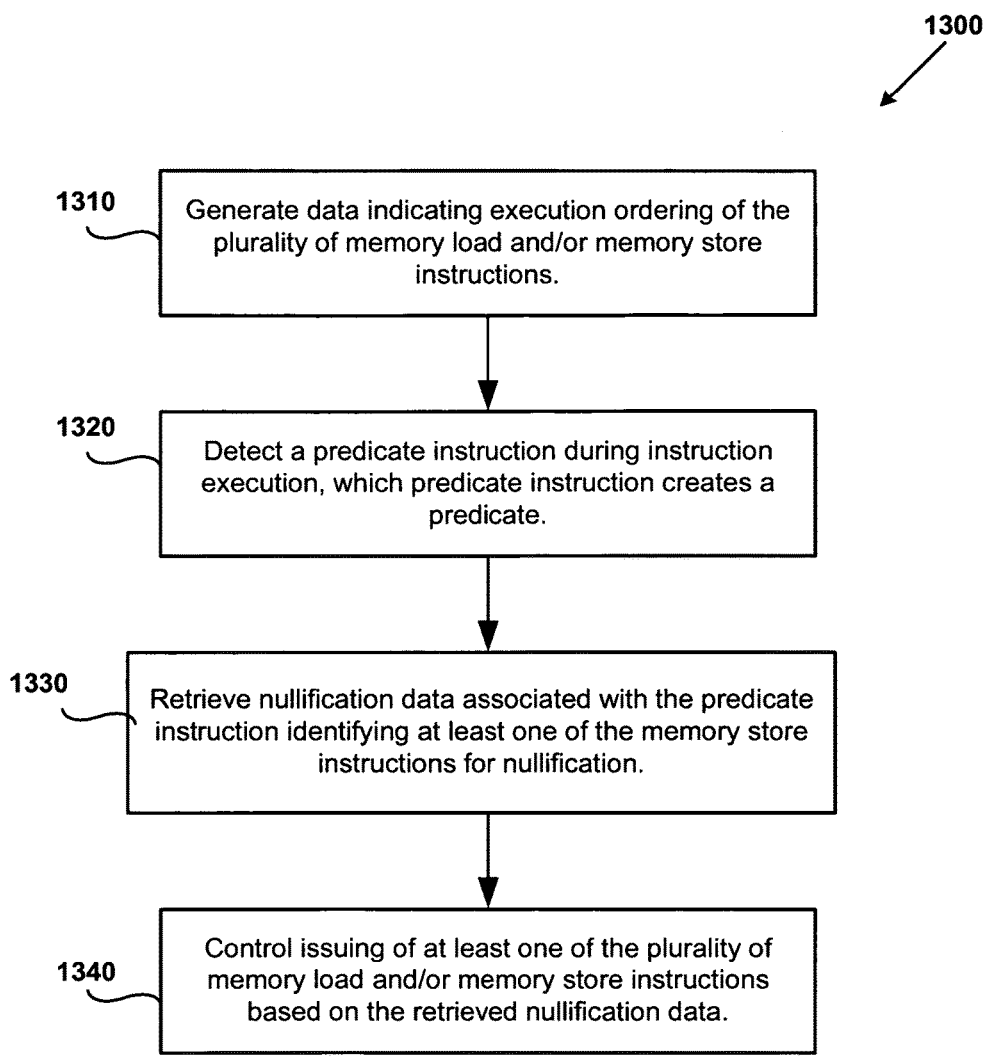
FIG. 13 is a flowchart outlining an example method of dynamic nullification of memory access instructions, as can be used in certain examples of the disclosed technology.

FIG. 13 is a flowchart outlining an example method of dynamic nullification of memory access instructions, as can be used in certain examples of the disclosed technology. Referring to FIGS. 8A and 13, the example method 1300 may start at process block 1310, when data indicating execution ordering of the plurality of memory load and/or memory store instructions can be generated. For example, the store mask 803 may be generated, which indicates execution ordering of memory access instructions (e.g., memory load and store instructions). At process block 1320, a predicate instruction can be detected during instruction execution. For example, predicate instructions P (instruction # 10) can be detected. At process block 1330, nullification data associated with the predicate instruction is retrieved. For example, if the condition associated with instruction P is satisfied, then the 00010100000 mask may be retrieved from the True column of NGT 804. The retrieved nullification data identifies at least one of the memory store instructions (e.g., store instructions S3 and S5 in the False arm of the predicate) for nullification based on whether a condition of the predicate instruction is satisfied. At process block 1340, issuing of at least one of the plurality of memory load and/or memory store instructions is controlled based on the retrieved nullification data. More specifically, after a predicate path is selected and the store instructions on the opposite path are dynamically nullified based on the NGT nullification data, then the predicate instruction can issue and the instruction execution for the remaining instructions can proceed.

XVII. Example Method of Compiling a Null Generation Table

Figure 14:
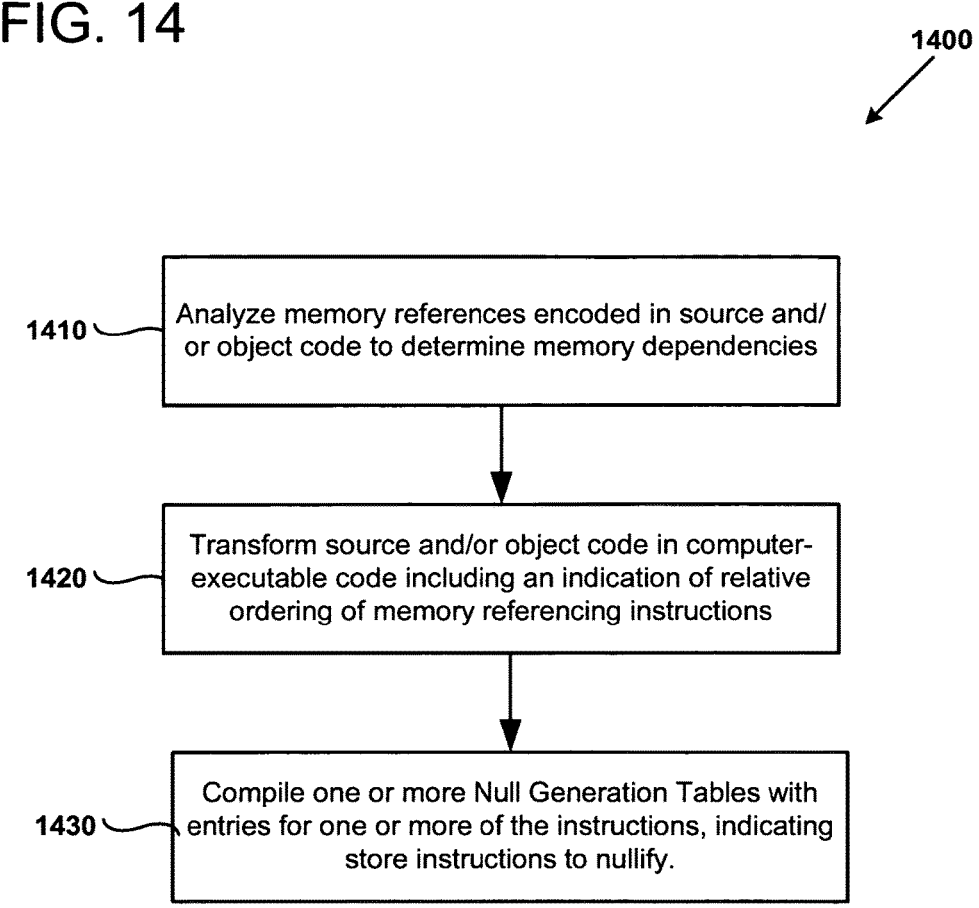
FIG. 14 is a flowchart outlining an example method of transforming source code and/or object code into block-based processor executable code and compiling one or more null generation tables, as can be performed in certain examples of the disclosed technology.

FIG. 14 is a flowchart 1400 outlining an example method of transforming source code and/or object code into block-based processor executable code and compiling one or more null generation tables, as can be performed in certain examples of the disclosed technology. For example, a general purpose processor and/or a block-based processor can be used to implement the method outlined in FIG. 14. In some examples, the code is transformed by a compiler and stored as object code that can be executed by a block-based processor (e.g., block-based processor 100). In some examples, a just-in-time compiler or an interpreter generates computer-executable code at runtime.

At process block 1410, memory references encoded in source and/or object code are analyzed to determine memory dependencies. For example, the memory dependencies can simply be the order in which the memory access instructions are arranged in the program. In other examples, memory addresses that are likely to be written by memory access instructions can be analyzed to determine whether there are overlaps between load store instructions in an instruction block. In some examples, determining memory dependencies includes identifying two memory access instructions in the instruction block, a first one of the memory access instructions being predicated on a complementary condition of a second one of the memory access instructions, and, based on the identifying, assigning a same identifier to the first and second memory access instruction. After analyzing the memory references, the method proceeds to process block 1420.

At process block 1420, source code and/or object code are transformed into block-based computer executable code that includes an indication of a relative ordering of memory access instructions in the instruction block. For example, LSID values can be encoded in the instruction. In other examples, the relative ordering is indicated by the instructions position within the block. In some examples, a store mask is generated and stored as an instruction block header for the instruction block. In some examples, the store mask indicates which of the load/store identifiers correspond to store memory access instructions. In some examples, a special instruction is provided in order to load the store mask into memory of the control unit for use in masking the store vector. Once the code has been transformed into block-based processor code, it can be stored in a computer readable storage medium, or transmitted via a computer network to another location for execution by a block-based processor. In some examples, the store mask may be generated dynamically, e.g., during instruction decode time.

At process block 1430, one or more null generation tables (e.g., NGT 804, 1110, 1230) may be generated prior to instruction execution. The NGTs may include entries for each condition of a predicate instruction, including nullification data or total count instruction number data, as discussed herein above in reference to FIGS. 8A, 11, and 12.

XVIII. Exemplary Computing Environment

Figure 15:
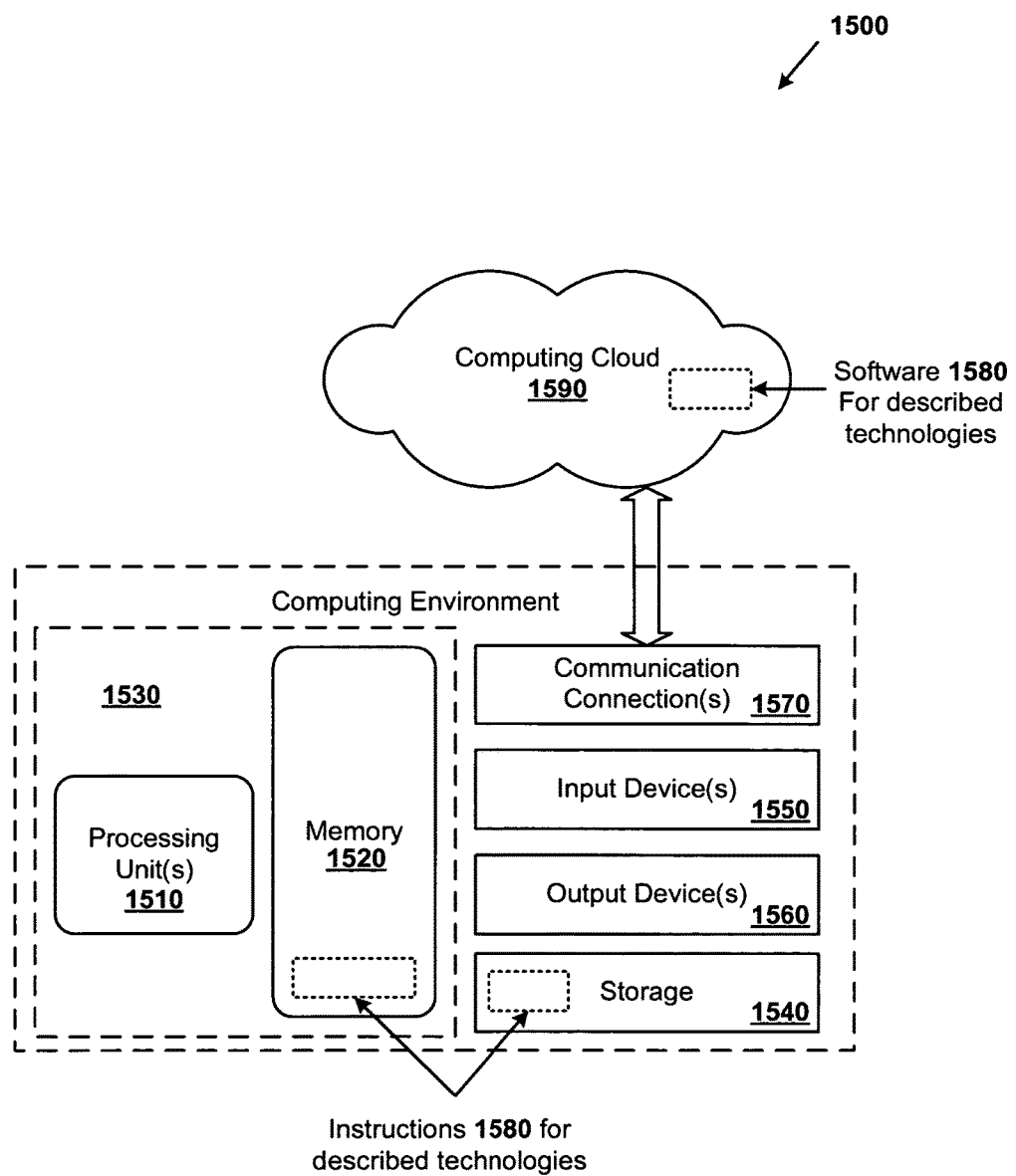
FIG. 15 is a block diagram illustrating a suitable computing environment for implementing some embodiments of the disclosed technology.

FIG. 15 illustrates a generalized example of a suitable computing environment 1500 in which described embodiments, techniques, and technologies, including configuring a block-based processor, can be implemented. For example, the computing environment 1500 can implement disclosed techniques for configuring a processor to operating according to one or more instruction blocks, or compile code into computer-executable instructions for performing such operations, as described herein.

The computing environment 1500 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 15, the computing environment 1500 includes at least one block-based processing unit 1510 and memory 1520. In FIG. 15, this most basic configuration 1530 is included within a dashed line. The block-based processing unit 1510 executes computer-executable instructions and may be a real or a virtual processor. In a multi-processing system, multiple processing units execute computer-executable instructions to increase processing power and as such, multiple processors can be running simultaneously. The memory 1520 may be volatile memory (e.g., registers, cache, RAM), non-volatile memory (e.g., ROM, EEPROM, flash memory, etc.), or some combination of the two. The memory 1520 stores software 1580, images, and video that can, for example, implement the technologies described herein. A computing environment may have additional features. For example, the computing environment 1500 includes storage 1540, one or more input device(s) 1550, one or more output device(s) 1560, and one or more communication connection(s) 1570. An interconnection mechanism (not shown) such as a bus, a controller, or a network, interconnects the components of the computing environment 1500. Typically, operating system software (not shown) provides an operating environment for other software executing in the computing environment 1500, and coordinates activities of the components of the computing environment 1500.

The storage 1540 may be removable or non-removable, and includes magnetic disks, magnetic tapes or cassettes, CD-ROMs, CD-RWs, DVDs, or any other medium which can be used to store information and that can be accessed within the computing environment 1500. The storage 1540 stores instructions for the software 1580, plugin data, and messages, which can be used to implement technologies described herein.

The input device(s) 1550 may be a touch input device, such as a keyboard, keypad, mouse, touch screen display, pen, or trackball, a voice input device, a scanning device, or another device, that provides input to the computing environment 1500. For audio, the input device(s) 1550 may be a sound card or similar device that accepts audio input in analog or digital form, or a CD-ROM reader that provides audio samples to the computing environment 1500. The output device(s) 1560 may be a display, printer, speaker, CD-writer, or another device that provides output from the computing environment 1500.

The communication connection(s) 1570 enable communication over a communication medium (e.g., a connecting network) to another computing entity. The communication medium conveys information such as computer-executable instructions, compressed graphics information, video, or other data in a modulated data signal. The communication connection(s) 1570 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1590. For example, disclosed compilers and/or block-based-processor servers are located in the computing environment, or the disclosed compilers can be executed on servers located in the computing cloud 1590. In some examples, the disclosed compilers execute on traditional central processing units (e.g., RISC or CISC processors).

Computer-readable media are any available media that can be accessed within a computing environment 1500. By way of example, and not limitation, with the computing environment 1500, computer-readable media include memory 1520 and/or storage 1540. As should be readily understood, the term computer-readable storage media includes the media for data storage such as memory 1520 and storage 1540, and not transmission media such as modulated data signals.

XIX. Additional Examples of the Disclosed Technology

Additional examples of the disclosed subject matter are discussed herein in accordance with the examples discussed above. It will be readily understood by one of ordinary skill in the art that the exemplary systems, methods, and apparatus described herein should not be construed as being limiting in any way, and are not limited to any specific aspect or feature or combinations thereof.

In some examples of the disclosed technology, an apparatus includes memory and one or more block-based processor cores. At least one of the cores includes an execution unit configured to execute memory access instructions comprising a plurality of memory load and/or memory store instructions contained in an instruction block. The core further includes a hardware structure storing data for at least one predicated instruction in the instruction block, the data identifying whether one or more of the memory store instructions will issue if a condition of the predicated instruction is satisfied. The core further includes a control unit configured to control issuing of the memory access instructions to the execution unit based at least in a part on the hardware structure data. The hardware structure is further configured to store data indicating execution ordering of at least some of the memory access instructions. The data indicating execution ordering is based at least in part on a load/store identifier (LSID) encoded for each of the memory access instructions in the instruction block. The control unit is further configured to issue one or more null store instructions based on the hardware structure data. The control unit includes a store vector register storing store vector data indicating which of the memory access instructions have executed. The control unit is further configured to modify the store vector data based on the hardware structure data, to indicate that if the condition of the predicate instruction is satisfied, one or more non-issuing instructions of the memory store instructions has issued. The control unit is further configured to compare the store vector data with store mask data to determine which of the memory store instructions have executed. The store mask data indicates execution ordering of at least some of the memory access instructions. The control unit is further configured to compare the store vector data with the store mask data to determine that all memory store instructions ordered before a current one of the memory access instructions have executed, and, based on the determination, issue the current memory access instruction to the execution unit. The hardware structure is a content addressable memory (CAM) or a lookup table. The data stored in the hardware structure is generated by an instruction decoder that decodes the memory access instructions.

In some examples of the disclosed technology, a method of operating a processor to execute a block of instructions comprising a plurality of memory load and/or memory store instructions includes generating data indicating execution ordering of the plurality of memory load and/or memory store instructions; detecting a predicate instruction during instruction execution; and retrieving nullification data associated with the predicate instruction. At least a portion of the nullification data identifies at least one of the memory store instructions for nullification based on whether a condition of the predicate instruction is satisfied. At least one of the plurality of memory load and/or memory store instructions is issued based on the retrieved nullification data. The nullification data is stored in a null generation table indexed by a predicate instruction number. The nullification data identifies a first subset of the memory store instructions for nullification if the condition is satisfied, and a second, disjoint subset of the memory store instructions for nullification if the condition is not satisfied. The data indicating execution ordering of the plurality of memory load and/or memory store instructions is a store mask generated during runtime. A total count of the memory store instructions is generated after the block of instructions is decoded. A counter is incremented or decremented when one of the memory store instruction is executed. At least a portion of the nullification data includes a number of store instructions that will execute based on whether the condition of the predicate instruction is satisfied. The counter is adjusted based. On the number of store instructions in the nullification data. The predicate instruction is issued when the counter reaches the total count.

In some examples of the disclosed technology, one or more computer-readable storage media storing computer-readable instructions that when executed by a block-based processor, cause the processor to perform a method, the computer-readable instructions including instructions for decoding a plurality of instructions for the instruction block, the plurality of instructions including memory store instructions. The computer-readable instructions further include instructions for detecting one or more predicate instructions in the plurality of instructions, each of the one or more predicate instructions having an associated condition. For each of the one or more predicate instructions, a first and a second mask are generated. The first mask indicates at least one of the store instructions that will execute if the associated condition is TRUE, and the second mask indicates at least another one of the store instructions that will execute if the associated condition is FALSE. The computer-readable instructions further include instructions for storing the generated first mask and second mask in a null generation table. The null generation table is indexed by an instruction number associated with each of the one or more predicate instructions.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus comprising memory and one or more block-based processor cores, at least one of the cores comprising:
   an execution unit configured to execute memory access instructions comprising a plurality of memory load and/or memory store instructions contained in an instruction block;
   a hardware structure storing:
      first data for at least one predicate instruction in the instruction block, the first data identifying whether one or more of the memory store instructions will issue when a condition of the predicate instruction is satisfied, and
      second data indicating execution ordering of at least some of the memory access instructions based at least in part on a load/store identifier (LSID) encoded in the instruction block and indicating a relative order in which the memory access instructions are executed; and
   a control unit configured to control issuing of the memory access instructions to the execution unit based at least in a part on the first data.

2. The apparatus of claim 1, wherein the hardware structure is further configured to store the second data indicating execution ordering of at least some of the memory access instructions.

3. The apparatus of claim 2, wherein the control unit is further configured to issue one or more null store instructions based on the hardware structure data.

4. The apparatus of claim 1, wherein the control unit comprises a store vector register storing store vector data indicating which of the memory access instructions have executed.

5. The apparatus of claim 4, wherein the control unit is further configured to modify the store vector data based on the hardware structure data, to indicate that when the condition of the predicate instruction is satisfied, one or more other instructions of the memory store instructions will not issue.

6. The apparatus of claim 4, wherein the control unit is further configured to compare the store vector data with store mask data to determine which of the memory store instructions have executed, the store mask data indicating execution ordering of at least some of the memory access instructions.

7. The apparatus of claim 6, wherein the control unit is further configured to compare the store vector data with the store mask data to determine that all memory store instructions ordered before a current one of the memory access instructions have executed, and, based on the determination, issue the current memory access instruction to the execution unit.

8. The apparatus of claim 1, wherein the hardware structure is a content addressable memory (CAM) or a lookup table.

9. The apparatus of claim 1, wherein the data stored in the hardware structure is generated by an instruction decoder that decodes the memory access instructions.

10. A method of operating a processor to execute a block of instructions comprising a plurality of memory load and/or memory store instructions, the method comprising:
    generating data indicating execution ordering of the plurality of memory load and/or memory store instructions;
    detecting a predicate instruction during instruction execution;

retrieving nullification data associated with the predicate instruction, the nullification data identifying a first subset of the memory store instructions for nullification when a condition of the predicate instruction is satisfied, and a second, disjoint subset of the memory store instructions for nullification when the condition is not satisfied; and issuing at least one of the plurality of memory load and/or memory store instructions based on the retrieved nullification data.

11. The method according to claim 10, wherein the nullification data is stored in a null generation table indexed by a predicate instruction number.

12. The method according to claim 10, wherein the data indicating execution ordering of the plurality of memory load and/or memory store instructions is a store mask generated during runtime.

13. The method according to claim 10, further comprising:

generating a total count of the memory store instructions after the block of instructions is decoded; and incrementing or decrementing a counter when one of the memory store instruction is executed.

14. The method according to claim 13, wherein at least a portion of the nullification data comprises a number of store instructions that will execute based on whether the condition of the predicate instruction is satisfied.

15. The method according to claim 14, further comprising:

adjusting the counter based on the number of store instructions in the nullification data; and issuing the predicate instruction when the counter reaches the total count.

16. One or more computer-readable storage media storing computer-readable instructions that when executed by a block-based processor, cause the processor to perform the method of claim 10.

17. One or more computer-readable storage media storing computer-readable instructions for an instruction block that when executed by a block-based processor, cause the processor to perform a method, the computer-readable instructions comprising:

instructions that cause the processor to decode a plurality of instructions for the instruction block, the plurality of instructions comprising memory store instructions;

instructions that cause the processor to detect one or more predicate instructions in the plurality of instructions, each of the one or more predicate instructions having an associated condition; and instructions that cause the processor to store a first mask and a second mask, wherein:

the first mask is indicative of at least one of the store instructions that will execute when the associated condition is TRUE, and the second mask is indicative of at least another one of the store instructions that will execute when the associated condition is FALSE.

18. The computer-readable storage media of claim 17, wherein the computer-readable instructions further comprise:

instructions for storing the first mask and the second mask in a null generation table, wherein the null generation table is indexed by an instruction number associated with each of the one or more predicate instructions.

* * * * *